United States Patent [19]
Van Phan

[11] Patent Number: 5,814,190
[45] Date of Patent: Sep. 29, 1998

[54] METHOD FOR MAKING PAPER WEB HAVING BOTH BULK AND SMOOTHNESS

[75] Inventor: Dean Van Phan, West Chester, Ohio

[73] Assignee: The Procter & Gamble Company, Cincinnati, Ohio

[21] Appl. No.: 748,872

[22] Filed: Nov. 14, 1996

Related U.S. Application Data

[63] Continuation-in-part of Ser. No. 462,239, Jun. 5, 1995, Pat. No. 5,776,312, which is a continuation-in-part of Ser. No. 268,213, Jun. 29, 1994, Pat. No. 5,556,509, Ser. No. 461, 832, Jun. 5, 1995, Ser. No. 268,154, Jun. 29, 1994, abandoned, and Ser. No. 439,526, May 11, 1995, which is a division of Ser. No. 268,133, Jun. 29, 1994, Pat. No. 5,549,790.

[51] Int. Cl.$^6$ .............................. B31F 1/12; D21H 15/02
[52] U.S. Cl. ....................... 162/111; 162/109; 162/117; 162/123; 428/152; 428/153
[58] Field of Search .................... 162/109, 111, 162/117, 123; 428/196, 152, 153

[56] References Cited

U.S. PATENT DOCUMENTS

| | | | |
|---|---|---|---|
| 65,730 | 6/1867 | Day | 162/117 |
| 391,582 | 10/1888 | Chase | 162/117 |
| 3,303,576 | 2/1967 | Sisson | 34/115 |
| 3,549,742 | 12/1970 | Benz | 264/250 |
| 3,812,000 | 5/1974 | Salvucci, Jr. | 162/111 |
| 3,879,257 | 4/1975 | Gentile et al. | 162/112 |
| 3,903,342 | 9/1975 | Roberts, Jr. | 428/153 |
| 3,994,771 | 11/1976 | Morgan, Jr. et al. | 162/113 |
| 4,000,237 | 12/1976 | Roberts, Jr. | 264/128 |
| 4,158,594 | 6/1979 | Becker | 162/112 |
| 4,166,001 | 8/1979 | Dunning et al. | 162/111 |
| 4,191,609 | 3/1980 | Trokhan | 162/113 |
| 4,208,459 | 6/1980 | Becker et al. | 428/154 |
| 4,225,382 | 9/1980 | Kearney et al. | 162/111 |
| 4,300,981 | 11/1981 | Carstens | 162/109 |
| 4,326,000 | 4/1982 | Roberts, Jr. | 428/153 |
| 4,469,735 | 9/1984 | Trokhan | 428/154 |
| 4,529,480 | 7/1985 | Trokhan | 162/109 |
| 4,533,437 | 8/1985 | Curran et al. | 162/281 |
| 4,637,859 | 1/1987 | Trokhan | 162/109 |
| 4,959,125 | 9/1990 | Spendel | 162/158 |
| 5,059,282 | 10/1991 | Ampulski et al. | 162/111 |
| 5,087,324 | 2/1992 | Awofeso et al. | 162/111 |
| 5,098,519 | 3/1992 | Ramasubramanian et al. | 162/109 |
| 5,279,767 | 1/1994 | Phan et al. | 252/357 |
| 5,312,522 | 5/1994 | Van Phan et al. | 162/111 |
| 5,411,636 | 5/1995 | Hermans et al. | 162/109 |
| 5,549,790 | 8/1996 | Phan | 162/109 |
| 5,556,509 | 9/1996 | Trokhan et al. | 162/111 |
| 5,575,891 | 11/1996 | Trokhan et al. | 162/111 |
| 5,609,725 | 3/1997 | Van Phan | 162/117 |

FOREIGN PATENT DOCUMENTS

| | | |
|---|---|---|
| 0675 225 A2 | 3/1995 | European Pat. Off. . |
| WO 95/17548 | 6/1995 | WIPO . |
| WO 96/00812 | 1/1996 | WIPO . |
| WO 96/00814 | 1/1996 | WIPO . |
| WO 96/25547 | 8/1996 | WIPO . |
| WO 96/25555 | 8/1996 | WIPO . |

*Primary Examiner*—Stanley S. Silverman
*Assistant Examiner*—Jose A. Fortuna
*Attorney, Agent, or Firm*—Gerry S. Gressel; Larry L. Huston; Roddy M. Bullock

[57] ABSTRACT

A paper web and method of making the paper web are disclosed. In one embodiment the paper web includes a continuation relatively thinner region and a plurality of discrete relatively thicker regions. The relatively thicker regions are disposed in the plane of the relatively thinner region. The paper web can have a relatively patterned face and a relatively smooth face. The paper structures can be dried relatively quickly and efficiently, and can provide enchanced absorbency and bulk density while having a relatively smooth face.

12 Claims, 15 Drawing Sheets

METHOD FOR MAKING PAPER WEB HAVING BOTH BULK AND SMOOTHNESS

CROSS-REFERENCE TO RELATED APPLICATIONS:

This is a continuation-in-part of the following U.S. patent application Ser. No. 08/462,239, filed Jun. 5, 1995, now U.S. Pat. No. 5,776,312 which is a continuation-in-part of Ser. No. 08/268,213, filed Jun. 29, 1994, now U.S. Pat. No. 5,556,509; Ser. No. 08/461,832, filed Jun. 5, 1995, which is a continuation-in-part of Ser. No. 08/268,154, filed Jun. 29, 1994, now abandoned; Ser. No. 08/439,526, filed May 11, 1995, which is a divisional of 08/268,133, filed Jun. 29, 1994, now U.S. Pat. No. 5,549,790.

FIELD OF THE INVENTION

The present invention relates to a paper structure, and more particularly, to a tissue paper web having both bulk and smoothness, and to a method for making such a tissue paper web.

BACKGROUND OF THE INVENTION

Paper structures, such as toilet tissue, paper towels, and facial tissue, are widely used throughout the home and industry. Many attempts have been made to make such tissue products more consumer preferred.

One approach to providing consumer preferred tissue products having bulk and flexibility is illustrated in U.S. Pat. No. 3,994,771 issued Nov. 30, 1976 to Morgan et al, which patent is incorporated herein by reference. Improved bulk and flexibility may also be provided through bilaterally staggered compressed and uncompressed zones, as shown in U.S. Pat. No. 4,191,609 issued Mar. 4, 1980 to Trokhan, which patent is incorporated herein by reference.

Another approach to making tissue products more consumer preferred is to dry the paper structure to impart greater bulk, tensile strength, and burst strength to the tissue products. Examples of paper structures made in this manner are illustrated in U.S. Pat. No. 4,637,859 issued Jan. 20, 1987 to Trokhan, which patent is incorporated herein by reference. U.S. Pat. No. 4,637,859 shows discrete dome shaped protuberances dispersed throughout a continuous network, and is incorporated herein by reference. The continuous network can provide strength, while the relatively thicker domes can provide softness and absorbency.

One disadvantage of the papermaking method disclosed in U.S. Pat. No. 4,637,859 is that drying such a web can be relatively energy intensive and expensive, and typically involves the use of through air drying equipment. In addition, the papermaking method disclosed in U.S. Pat. No. 4,637,859 can be limited with respect to the speed at which the web can be finally dried on the Yankee dryer drum. This limitation is thought to be due, at least in part, to the pattern imparted to the web prior to transfer of the web to the Yankee drum. In particular, the discrete domes described in U.S. Pat. No. 4,637,859 may not be dried as efficiently on the Yankee surface as is the continuous network described in U.S. Pat. No. 4,637,859. Accordingly, for a given consistency level and basis weight, the speed at which the Yankee drum can be operated is limited.

The following publications show additional methods for making a paper web and are incorporated herein by reference: WO 95/17548 published Jun. 29, 1995 in the name of Ampulski et al. and having a Dec. 20, 1993 U.S. priority date; WO 96/00812 published Jan. 11, 1996 in the name of Trokhan et al. and having a Jun. 29, 1994 U.S. priority date; WO 96/00814 published Jan. 11, 1996 in the name of Phan and having a Jun. 29, 1994 priority date; U.S. Pat. No. 5,556,509 issued Sep. 17, 1996 to Trokhan et al.; and U.S. Pat. No. 5,549,790 issued Aug. 27, 1996 to Phan.

U.S. Pat. No. 4,326,000; 4,000,237; and 3,903,342 describe sheet materials having elastomeric bonding materials connecting surfaces of the sheet together in a pattern. Such a method has the disadvantage that application of the bonding materials can be relatively expensive and difficult to control at production speeds. Additionally, the elastomeric bonding material may reduce the absorbency of the web.

Conventional tissue paper made by pressing a web with one or more press felts in a press nip can be made at relatively high speeds. The conventionally pressed paper, once dried, can then be embossed to pattern the web, and to increase the macro-caliper of the web. For example, embossed patterns formed in tissue paper products after the tissue paper products have been dried are common.

However, embossing processes typically impart a particular aesthetic appearance to the paper structure at the expense of other properties of the structure. In particular, embossing a dried paper web disrupts bonds between fibers in the cellulosic structure. This disruption occurs because the bonds are formed and set upon drying of the embryonic fibrous slurry. After drying the paper structure, moving fibers normal to the plane of the paper structure by embossing breaks fiber to fiber bonds. Breaking bonds results in reduced tensile strength of the dried paper web. In addition, embossing is typically done after creping of the dried paper web from the drying drum. Embossing after creping can disrupt the creping pattern imparted to the web. For instance, embossing can eliminate the creping pattern in some portions of the web by compacting or stretching the creping pattern. Such a result is undesirable because the creping pattern improves the softness and flexibility of the dried web.

Scientists and engineers in the papermaking arts continue to search for improved methods of making soft, strong, and absorbent tissue paper which can be dried efficiently at reduced expense.

Accordingly, one object of the present invention is to provide a paper web and method for making a multi-region paper web which allow relatively faster drying with relatively lower energy and expense.

Another object of the present invention is to provide a method for making a multi-region paper which can be formed on an existing paper machine (conventional or through air drying capability) without the need for substantial modification of the papermaking machine.

Another object of the present invention is to provide a paper web and method for making a paper web where the web has at least two different, nonembossed regions distinguishable by one or more of the following properties: thickness, elevation, density, and basis weight.

Another object is to provide a paper web and method of making the paper web where the web has an enhanced bulk caliper, bulk density, and absorbent capacity with a relatively patterned face and relatively smooth opposite face, thereby providing both the properties of bulk and softness desired by consumers of paper products.

Another object of the present invention is to provide a paper web and method of making the paper web where the web is substantially free of binding materials, such as elastomeric binding materials, which adversely affect the absorbency.

SUMMARY OF THE INVENTION

The present invention provides a method of forming a wetlaid paper web. The method comprises the steps of: forming an embryonic web of papermaking fibers on a foraminous forming member, wherein the web has a first surface and a second surface; transferring the web to a web support apparatus having a web facing side comprising a first web contacting surface and a second web contacting surface, wherein the difference in elevation between the first and second web contacting surfaces is less than the thickness of the embryonic web; imparting a pattern to the first face of the web at a web consistency of between about 10 and about 60 percent; transferring the web to a heated drying surface wherein substantially all of the second surface of the web is positioned adjacent the heated drying surface; and creping the web from the heated drying surface.

The step of forming the embryonic web preferably comprises forming an embryonic web comprising a fiber debonding agent. In one embodiment, the step of forming the embryonic web comprises forming a multiple layer web, wherein an intermediate layer of the embryonic web comprises the fiber debonding agent.

In one embodiment, the web support apparatus comprises a dewatering felt layer, and the difference in elevation between the first and second web contacting surfaces is less than about 6.0 mils, and more preferably less than about 2.0 mils.

DESCRIPTION OF THE DRAWINGS

While the Specification concludes with claims particularly pointing out and distinctly claiming the present invention, the invention will be better understood from the following description taken in conjunction with the associated drawings, in which like elements are designated by the same reference numeral, and:

DETAILED DESCRIPTION OF THE INVENTION

Figure 1:
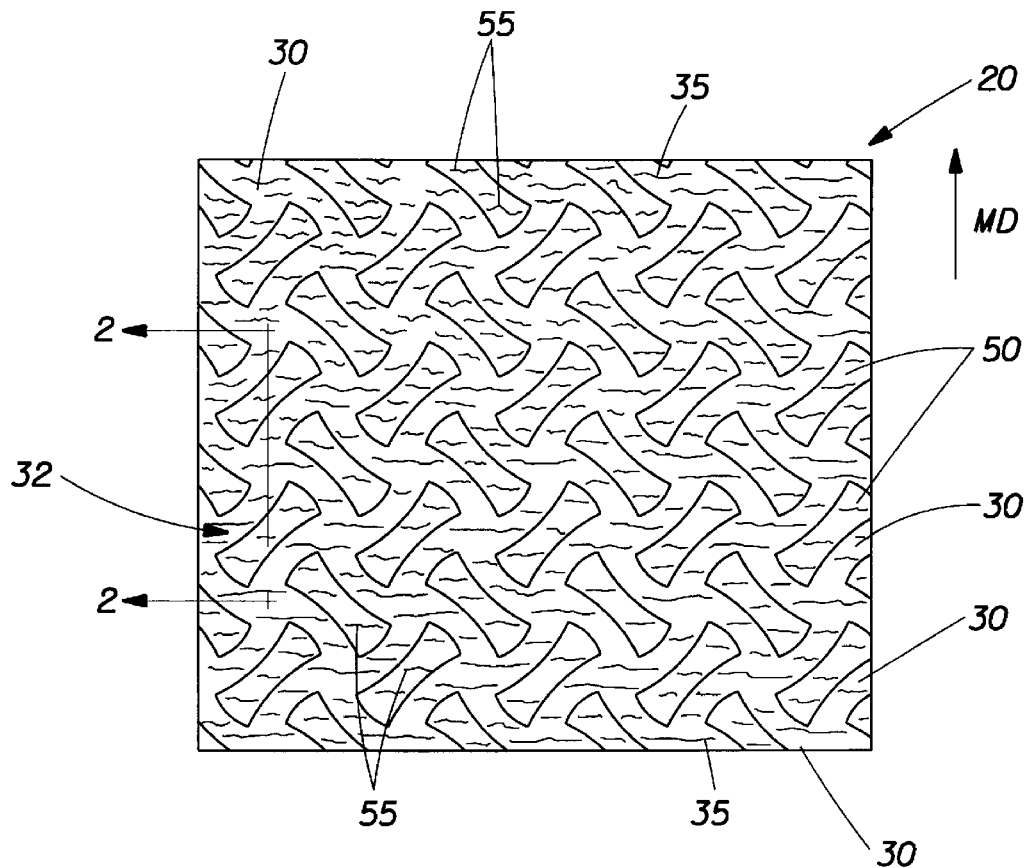
FIG. 1 is a plan view illustration of the first surface of a paper structure according to one embodiment of the present invention, the paper structure having a first, relatively thinner continuous network region and a plurality of relatively thicker, discrete regions dispersed throughout the continuous network region.
Figure 2:
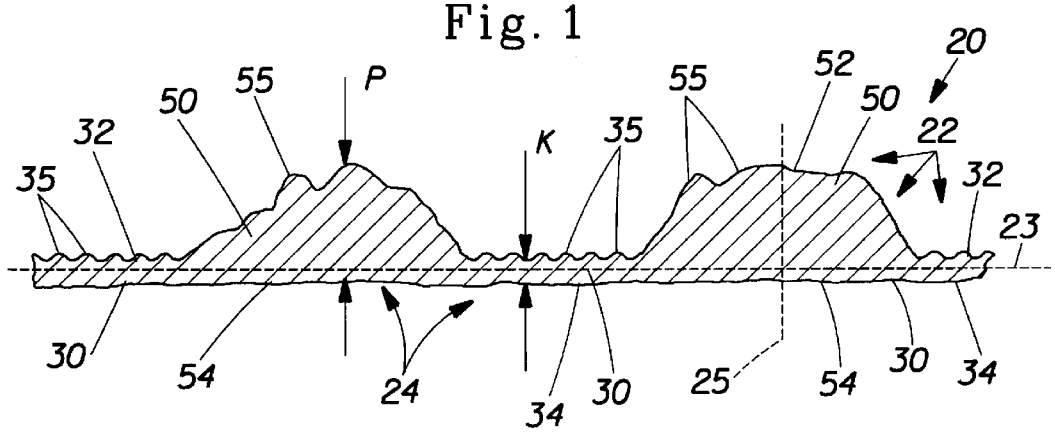
FIG. 2 is a cross-sectional illustration of the paper structure of FIG. 1 taken along lines 2—2 in FIG. 1 and showing the relatively thicker, discrete regions disposed in the plane of the continuous network region.
Figure 3:
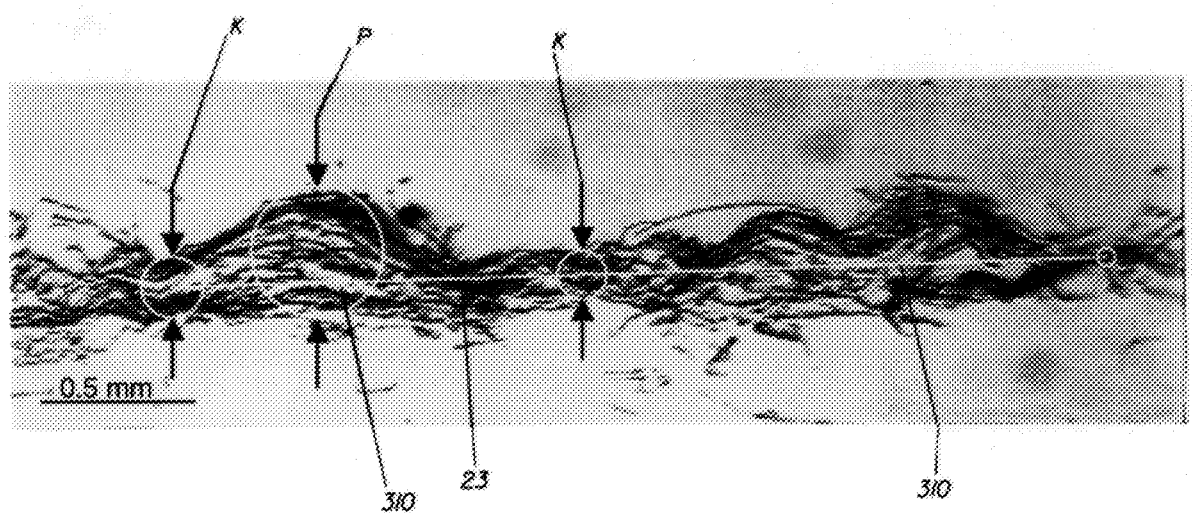
FIG. 3 is a photomicrograph of a cross-section of a paper structure of the type illustrated in FIGS. 1 and 2.
Figure 4:
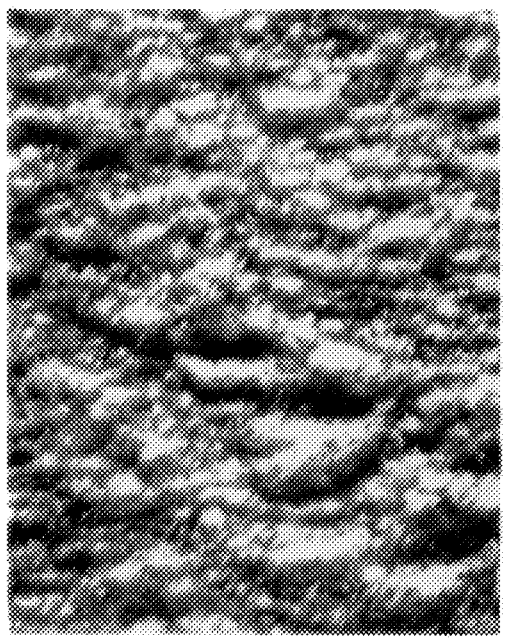
FIG. 4 is a photograph of the first surface of a paper structure of the type illustrated in FIGS. 1 and 2.
Figure 5:
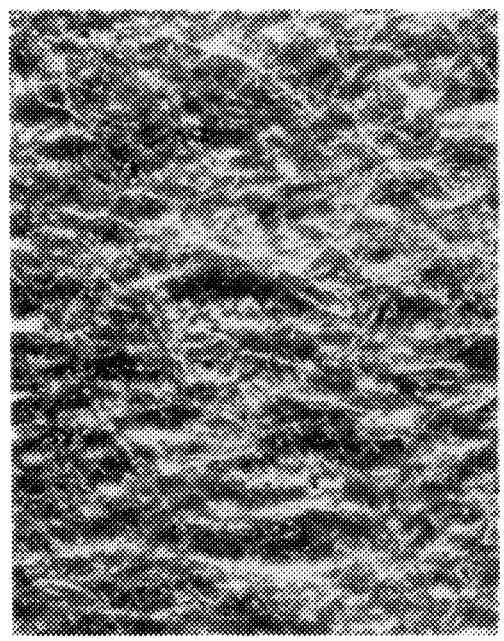
FIG. 5 is a photograph of the second surface of a paper structure of the type illustrated in FIGS. 1 and 2.

FIGS. 1–2 illustrate a paper web 20 made according to one embodiment of the present invention, and FIGS. 3–5 are photographs of a paper structure of the type illustrated in FIGS. 1 and 2. For comparison purposes, FIGS. 6 and 7A–C show a paper web of the type described in U.S. Pat. No. 4,637,859.

The paper web made according to one embodiment of the present invention comprises a relatively thinner region and a relatively thicker region, wherein the relatively thicker region is disposed in the plane of the relatively thinner region. The paper web is wetlaid, and can be substantially free of dry embossments. Referring to FIGS. 1–5, the paper web 20 has first and second oppositely facing surface 22 and 24, respectively. The paper web 20 comprises a relatively thinner, continuous network region 30, having a thickness designated K. The portion of the surface 22 bordering the region 30 is designated 32, and the portion of the surface 24 bordering region 30 is designated 34.

The web 20 also includes a plurality of relatively thicker regions 50 dispersed throughout the continuous network region 30. The relatively thicker regions 50 have a thickness designated P, and extend from the surface 32 of the continuous network region 30. The portion of the surface 22 bordering the regions 50 is designated 52 and the portion of the surface 24 bordering the regions 50 is designated 54. The thickness P is greater than the thickness K. Preferably, the ratio of P/K is at least about 1.5. Referring to FIG. 3, P can be at least about 0.3 mm, and preferably at least about 0.40 mm. K can be less than about 0.25 mm, and more preferably less than about 0.20 mm.

The continuous network region 30 and the discrete, relatively thicker regions 50 can both be foreshortened, such as by creping. In FIGS. 1–2, the crepe ridges of the continuous network region are designated by numeral 35, and extend in a generally cross-machine direction. Similarly, the discrete, relatively thicker regions 50 can also be foreshortened to have crepe ridges 55.

The continuous network region 30 can be a relatively high density, macroscopically monoplanar continuous network region of the type disclosed in U.S. Pat. No. 4,637,859. The relatively thicker regions 50 can be relatively low density, and can be bilaterally staggered, as disclosed in U.S. Pat. No. 4,637,859. However, the relatively thicker regions 50 are not domes of the type shown in U.S. Pat. 4,637,859.

The relatively thicker regions 50 are disposed in the plane of the continuous network region 30. The elevation of the plane of the network region 30 is schematically illustrated by surface 23 (appears as a line in FIG. 2). Surface 23 is positioned midway between the surfaces 32 and 34. While the plane of the network 30 is illustrated as being flat in FIG. 2, it will be understood that the "plane of the network 30" can comprise a surface 23 having curvature.

By the phrase "disposed in the plane of the continuous network region 30", it is meant that a relatively thicker region 50 includes a portion extending both above and below the surface 23. As shown in FIG. 2, a portion of a thicker region 50 extends along an imaginary line 25. The portion of the region 50 extending along the imaginary line 25 is disposed both above and below the surface 23, such that the intersection of the line 25 with the surface 52 is above the surface 23 and the intersection of the line 25 with the surface 54 is below the surface 23.

The procedure for measuring the thicknesses P and K, and the procedure for determining the location of the surface 23 to determine if the region 50 is disposed in the plane of the region 30 are described below under "Measurement of Thickness and Elevation."

Figure 6:
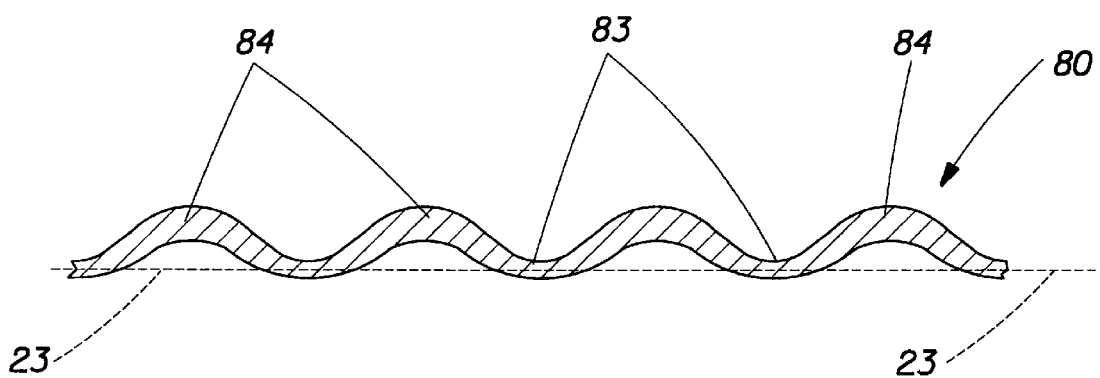
FIG. 6 is a cross-sectional illustration of prior art paper of the type shown in U.S. Pat. No. 4,637,859.
Figure 7A:
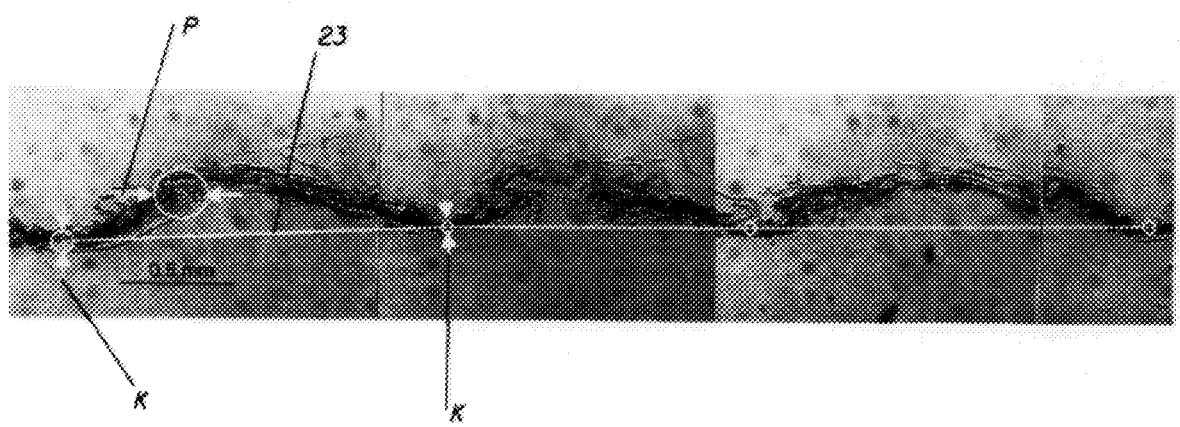
FIG. 7A is a photomicrograph of a cross-section of a paper web of the type shown in U.S. Pat. No. 4,637,859.
Figure 7B:
FIG. 7B is a plan view of one side of a paper web of the type shown in U.S. Pat. No. 4,637,859.
Figure 7C:
FIG. 7C is a plan view of the other side of the paper web of FIG. 7B

In contrast to the paper web illustrated in FIGS. 1–2, the paper web 80 illustrated in FIG. 6, which is disclosed in U.S. Pat. No. 4,637,859, does not have relatively thicker regions disposed in the plane of a continuous network. U.S. Pat. No. 4,637,859 discloses domes 84 dispersed in a continuous network 83. In FIG. 6, the domes 84 are not disposed in the plane of the network 83. Instead, as shown in FIG. 6, the lower surface of the domes 84 is disposed above the surface 23 depicted in FIG. 6. A photomicrograph of a paper web of the type disclosed in U.S. Pat. No. 4,637,859 is shown in FIG. 7A, and the oppositely facing surfaces of such a paper web are shown in FIGS. 7B and 7C.

Accordingly, the paper web 20 shown in FIGS. 1 and 2 can have the strength benefits of the continuous network region 30, the bulk density, macro-caliper, absorbency and softness benefits derived from the relatively thicker regions 50, yet have a relatively smooth surface 24 as compared to paper of the type illustrated in U.S. Pat. No. 4,637,859.

In particular, the paper web 20 can have surface smoothness ratio greater than about 1.15, more preferably greater than about 1.20, even more preferably greater than about 1.25, still more preferably greater than about 1.30, and most preferably greater than about 1.40, where the surface smoothness ratio is the value of the surface smoothness of surface 22 divided by the value of the smoothness value of surface 24.

In one embodiment, the surface 24 of the web 20 can have a surface smoothness value of less than about 900, and more preferably less than about 850. The opposite surface 22 can have a surface smoothness value of at least about 900, and more preferably at least about 1000.

The method for measuring the value of the surface smoothness of a surface is described below under "Surface Smoothness." The value of surface smoothness for a surface increases as the surface becomes more textured and less smooth. Accordingly, a relatively low value of surface smoothness indicates a relatively smooth surface.

In contrast to paper webs 20 of the present invention, a sample of paper of the type disclosed in U.S. Pat. No. 4,637,859 can exhibit a surface smoothness ratio of about 1.07, and surface smoothness values of about 993 and 1065 on opposite surfaces.

One advantage of a paper web 20 is the combination of the relatively smooth surface 24 for providing softness, the relatively thicker regions 50 for providing relatively high bulk and absorbency, and the compacted relatively thinner, relatively high density network region 30 for strength. Additionally, the paper web 20 can be formed and dried relatively quickly and efficiently, as described below.

The paper web 20 having the relatively smooth surface 24 can be useful in making a multiple ply tissue having smooth outwardly facing surfaces. For instance, two or more webs 20 can be combined to form a multiple ply tissue, such that the two outwardly facing surfaces of the multiple ply tissue comprise the surfaces 24 of the webs 20, and the surfaces 22 of the outer plies face inwardly. Such a multiple ply tissue can have the strength and bulk benefits associated with relatively thicker regions dispersed throughout a continuous network region, yet present a relatively smooth and soft outward surface to the consumer's touch.

Figure 9A:
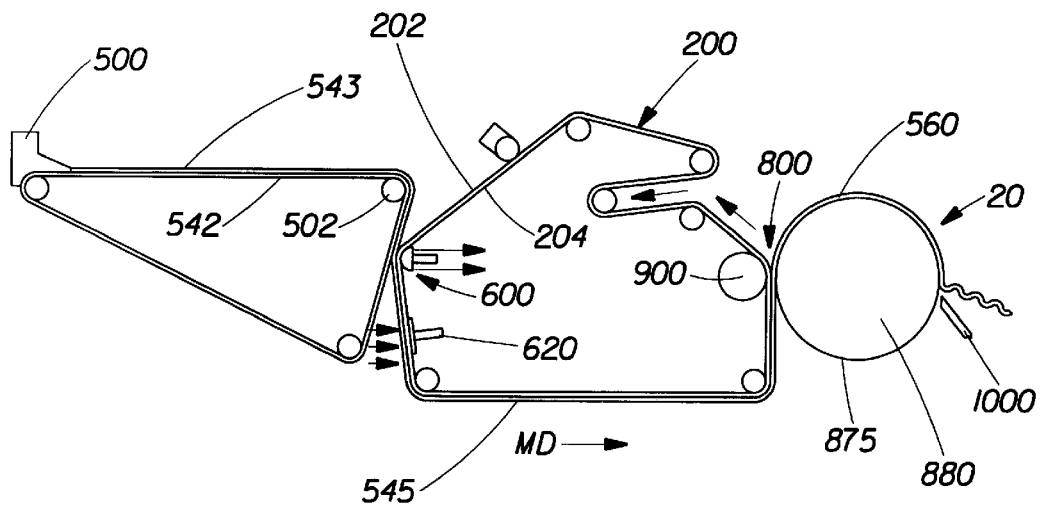
FIG. 9A is an illustration of a papermachine for making a paper web with the apparatus of FIGS. 8A and 8B.
Figure 9B:
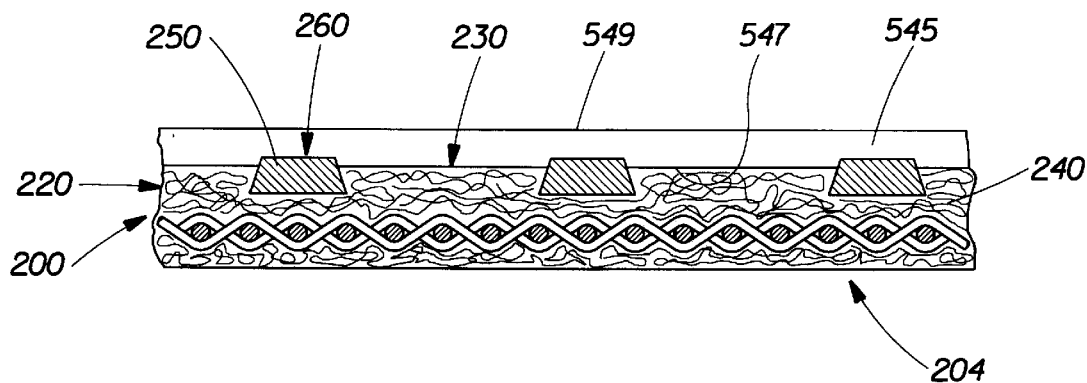
FIG. 9B is an illustration showing a paper web transferred to the apparatus shown in FIG. 8B to form a paper web having a first surface conformed to the apparatus and a second substantially smooth surface.
Figure 9C:
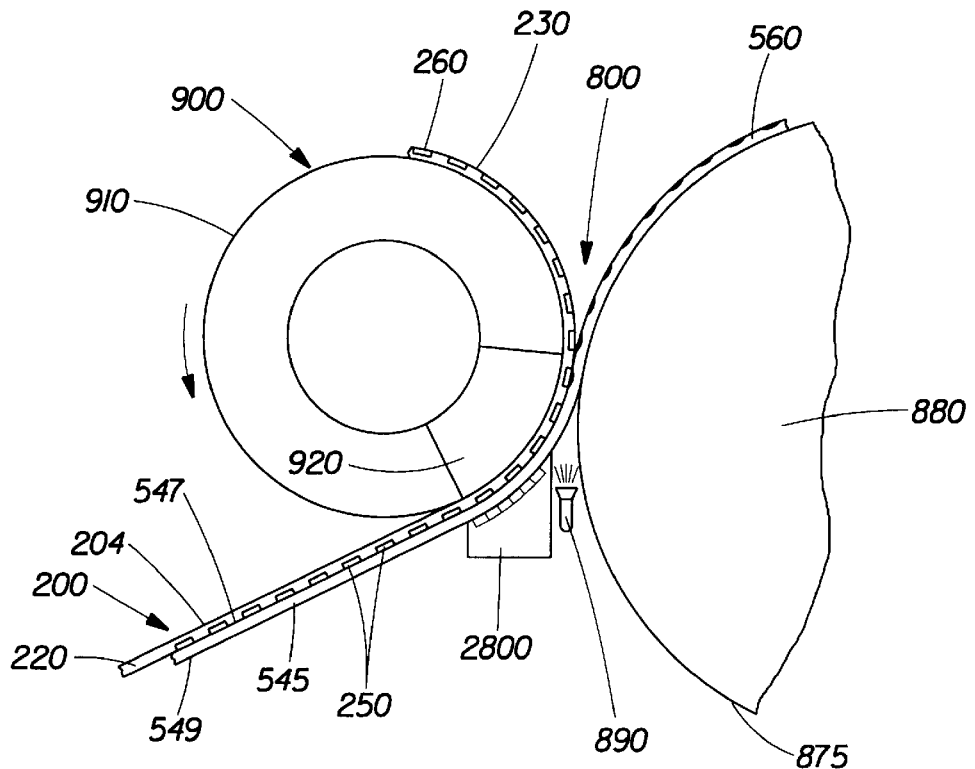
FIG. 9C is an illustration of a paper web on the apparatus shown in FIG. 8B being carried between a vacuum pressure roll and a Yankee drying drum to impart a pattern to the first surface of the paper web and to adhere the second surface of the paper web to the Yankee drum.
Figure 9D:
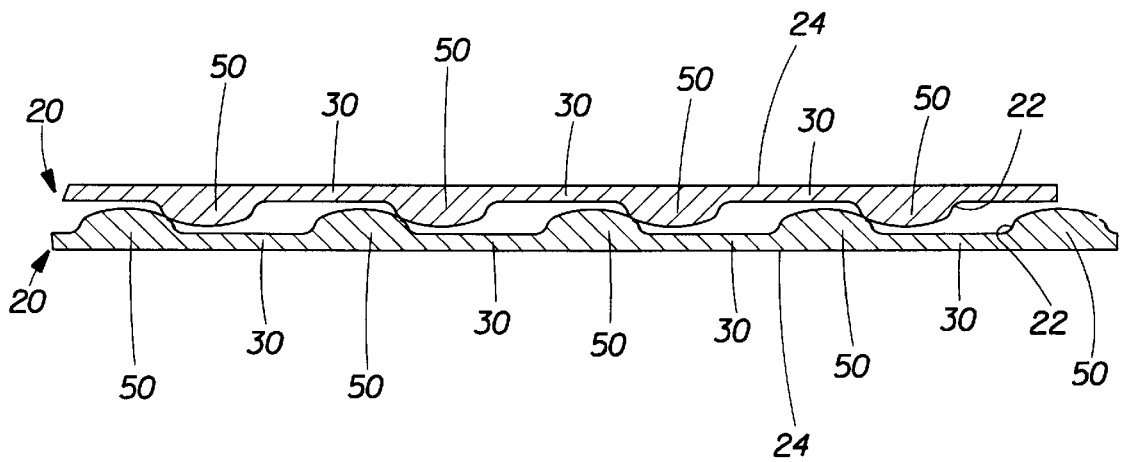
FIG. 9D is an illustration of a cross-section of a two ply tissue comprising two webs of the type shown in FIG. 2, with the relatively smoother second surfaces of the webs facing outwardly.

An example of such a two ply tissue is illustrated in FIG. 9D. The two webs 20 can be joined together in face to face relationship in any suitable manner, including but limited to adhesively, mechanically, and ultrasonically, and combinations of those methods.

The paper web 20 can have a basis weight of about 7 to about 70 grams per square meter. The paper web 20 can have a macro-caliper of at least about 0.1 mm, and more preferably at least about 0.2 millimeter and a bulk density of less than about 0.12 gram per cubic centimeter (basis weight divided by macro-caliper). The procedures for measuring the basis weight, macro-caliper, and bulk density of a web are described below.

The paper web 20 of the type shown in FIGS. 1–2 can also have an absorbent capacity of at least about 20 grams per gram. The method for measuring the absorbent capacity is described below. Accordingly, the paper web 20 exhibits the absorbency benefits of high bulk paper webs, in combination with the benefits of a relatively smooth surface usually associated with conventional felt pressed tissue paper.

Web Support Apparatus

Figure 8A:
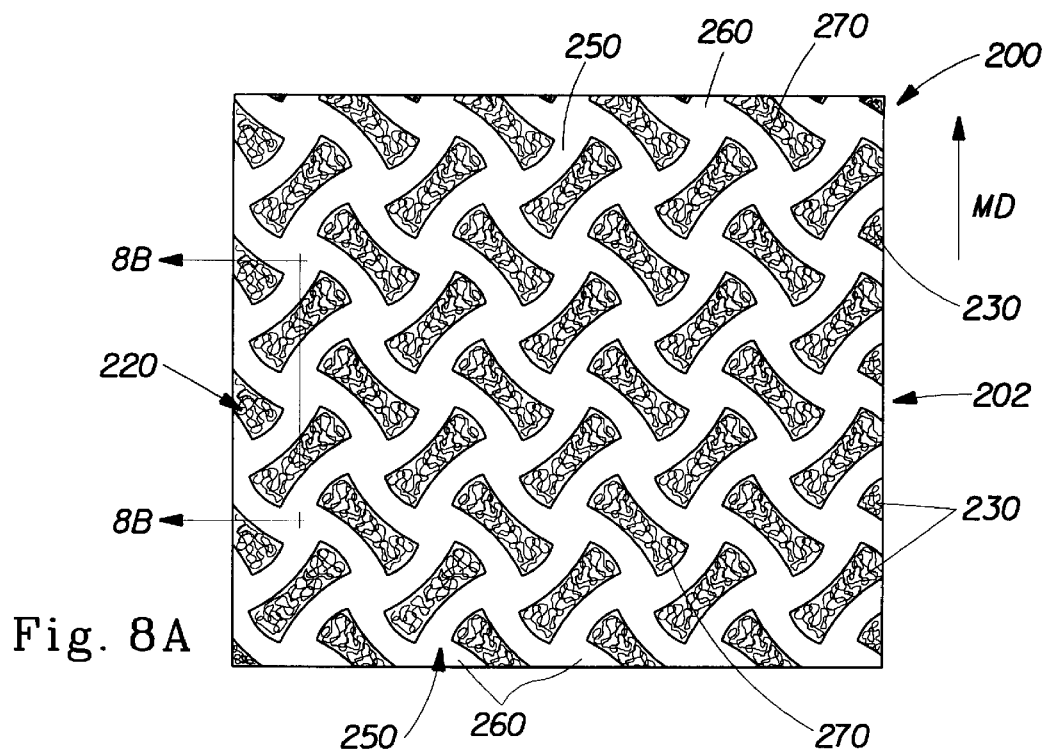
FIG. 8A is a plan view illustration of an apparatus for use in making a paper web of the type illustrated in FIGS. 1 and 2, the apparatus comprising a dewatering felt layer and a web patterning layer joined to the dewatering felt layer and having a continuous network web contacting top surface.
Figure 8B:
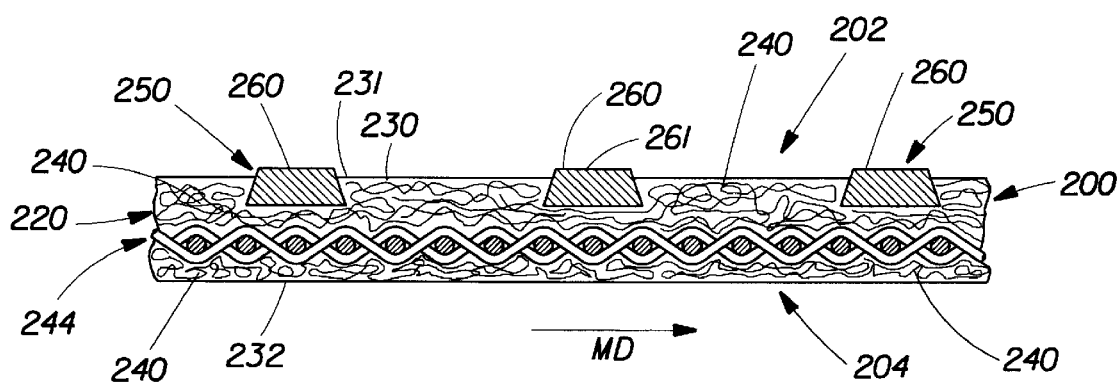
FIG. 8B is a cross-sectional illustration of the apparatus of FIG. 8A taken along lines 8B in FIG. 8A.

FIGS. 8A and 8B illustrate a web support apparatus 200 for use in making a paper web of the type illustrated in FIGS. 1 and 2. The web support apparatus 200 comprises a dewatering felt layer 220 and a web patterning layer 250. The web support apparatus 200 can be in the form of a continuous belt for drying and imparting a pattern to a paper web on a paper machine. The web support apparatus 200 has a first web facing side 202 and a second oppositely facing side 204. The web support apparatus 200 is viewed with the first web facing side 202 toward the viewer in FIG. 8A. The first web facing side 202 comprises a first web contacting surface and a second web contacting surface.

In FIG. 8A and 8B, the first web contacting surface is a first felt surface 230 of the felt layer 220. The first felt surface 230 disposed at a first elevation 231. The first felt surface 230 is a web contacting felt surface. The felt layer 220 also has oppositely facing second felt surface 232.

In FIG. 8A and 8B the second web contacting surface is provided by the web patterning layer 250. The web patterning layer 250, which is joined to the felt layer 220, has a web contacting top surface 260 at a second elevation 261. The difference between the first elevation 231 and the second elevation 261 is less than the thickness of the paper web when the paper web is transferred to the web support apparatus 200. The surfaces 260 and 230 can be disposed at the same elevation, so that the elevations 231 and 261 are the same. Alternatively, surface 260 can be slightly above surface 230, or surface 230 can be slightly above surface 260.

The difference in elevation is greater than or equal to 0.0 mils and less than about 8.0 mils. In one embodiment, the difference in elevation is less than about 6.0 mils (0.15 mm), more preferably less than about 4.0 mils (0.10 mm), and most preferably less than about 2.0 mil (0.05 mm), in order to maintain a relatively smooth surface 24, as described below.

Figure 8C:
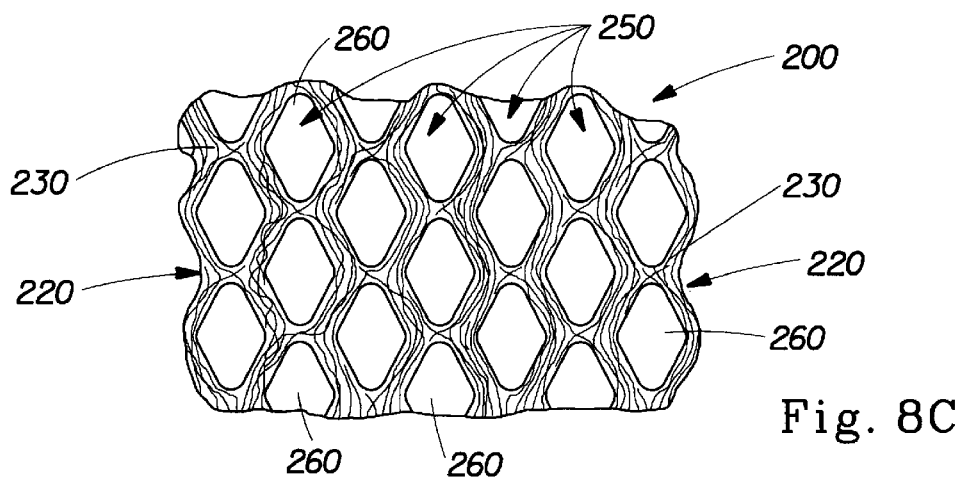
FIG. 8C is a plan view illustration of an apparatus comprising a dewatering felt layer and a web patterning layer, the web patterning layer comprising discrete web contacting surfaces.

The dewatering felt layer 220 is water permeable and is capable of receiving and containing water pressed from a wet web of papermaking fibers. The web patterning layer 250 is water impervious, and does not receive or contain water pressed from a web of papermaking fibers. The web patterning layer 250 can have a continuous web contacting top surface 260, as shown in FIG. 8A. Alternatively, the web patterning layer can be discontinuous or semicontinuous. A discontinuous top surface 260 is illustrated in FIG. 8C.

The web patterning layer 250 preferably comprises a photosensitive resin which can be deposited on the first surface 230 as a liquid and subsequently cured by radiation so that a portion of the web patterning layer 250 penetrates, and is thereby securely bonded to, the first felt surface 230. The web patterning layer 250 preferably does not extend through the entire thickness of the felt layer 220, but instead extends through less than about half the thickness of the felt layer 220 to maintain the flexibility and compressibility of the web support apparatus 200, and particularly the flexibility and compressibility of the felt layer 220.

A suitable dewatering felt layer 220 comprises a nonwoven batt 240 of natural or synthetic fibers joined, such as by needling, to a support structure formed of woven filaments 244. Suitable materials from which the nonwoven batt can be formed include but are not limited to natural fibers such as wool and synthetic fibers such as polyester and nylon. The fibers from which the batt 240 is formed can have a denier of between about 3 and about 20 grams per 9000 meters of filament length.

The felt layer 220 can have a layered construction, and can comprise a mixture of fiber types and sizes. The felt layer 220 is formed to promote transport of water received from the web away from the first felt surface 230 and toward the second felt surface 232. The felt layer 220 can have finer, relatively densely packed fibers disposed adjacent the first felt surface 230. The felt layer 220 preferably has a relatively high density and relatively small pore size adjacent the first felt surface 230 as compared to the density and pore size of the felt layer 220 adjacent the second felt surface 232, such that water entering the first surface 230 is carried away from the first surface 230.

The dewatering felt layer 220 can have a thickness greater than about 2 mm. In one embodiment the dewatering felt layer 220 can have a thickness of between about 2 mm and about 5 mm.

PCT Publications WO 96/00812 published Jan. 11, 1996, WO 96/25555 published Aug. 22, 1996, WO 96/25547 published Aug. 22, 1996, all in the name of Trokhan et al.; U.S. patent application Ser. No. 08/701,600 "Method for Applying a Resin to a Substrate for Use in Papermaking" filed Aug. 22, 1996; U.S. patent application Ser. No. 08/640, 452 "High Absorbence/Low Reflectance Felts with a Pattern Layer" filed Apr. 30, 1996; and U.S. patent application Ser. No. 08/672,293 "Method of Making Wet Pressed Tissue Paper with Felts Having Selected Permeabilities" filed Jun. 28, 1996 are incorporated herein by reference for the purpose of disclosing applying a photosensitive resin to a dewatering felt and for the purpose of disclosing suitable dewatering felts.

The dewatering felt layer 220 can have an air permeability of less than about 200 standard cubic feet per minute (scfm), where the air permeability in scfm is a measure of the number of cubic feet of air per minute that pass through a one square foot area of a felt layer, at a pressure differential across the dewatering felt thickness of about 0.5 inch of water. In one embodiment, the dewatering felt layer 220 can have an air permeability of between about 5 and about 200 scfm, and more preferably less than about 100 scfm.

The dewatering felt layer 220 can have a basis weight of between about 800 and about 2000 grams per square meter, an average density (basis weight divided by thickness) of between about 0.35 gram per cubic centimeter and about 0.45 gram per cubic centimeter. The air permeability of the web support apparatus 200 is less than or equal to the permeability of the felt layer 220.

One suitable felt layer 220 is an Amflex 2 Press Felt manufactured by the Appleton Mills Company of Appleton, Wis. The felt layer 220 can have a thickness of about 3 millimeter, a basis weight of about 1400 gm/square meter, an air permeability of about 30 scfm, and have a double layer support structure having a 3 ply multifilament top and bottom warp and a 4 ply cabled monofilament cross-machine direction weave. The batt 240 can comprise polyester fibers having a denier of about 3 at the first surface 230, and a denier of between about 10–15 in the batt substrate underlying the first surface 230.

The web support apparatus 200 shown in FIG. 8A has a web patterning layer 250 having a continuous network web contacting top surface 260 having a plurality of discrete openings 270 therein. Suitable shapes for the openings 270 include, but are not limited to circles, ovals elongated in the machine direction (MD in FIG. 8A), polygons, irregular shapes, or mixtures of these. The projected surface area of the continuous network top surface 260 can be between about 5 and about 75 percent of the projected area of the web support apparatus 200 as viewed in FIG. 8A, and is preferably between about 25 percent and about 50 percent of the projected area of the apparatus 200.

In the embodiment shown in FIG. 8a, the continuous network top surface 260 can have less than about 700 discrete openings 270 per square inch of the projected area of the apparatus 200, and preferably between about 10 and about 400 discrete openings 270 therein per square inch of projected area of the apparatus as viewed in FIG. 8A. The discrete openings 270 can be bilaterally staggered in the machine direction (MD) and cross-machine direction (CD) as described in U.S. Pat. No. 4,637,859 issued Jan. 20, 1987. In one embodiment, the openings 270 can be over-lapping and bilaterally staggered, with the openings sized and spaced such that in both the machine and cross-machine directions the edges of the openings 270 extend past one another, and such that any line drawn parallel to either the machine or cross-machine direction will pass through at least some openings 270.

Papermaking Method Description

A paper structure 20 according to the present invention can be made with the papermaking apparatus shown in FIGS. 9A, 9B, and 9C. Referring to FIG. 9A, the method of making the paper structure 20 of the present invention is initiated by providing an aqueous dispersion of papermaking fibers in the form of a slurry, and depositing the slurry of papermaking fibers from a headbox 500 onto a foraminous, liquid pervious forming member, such as a forming belt 542, followed by forming an embryonic web of papermaking fibers 543 supported by the forming belt 542. For simplicity the forming belt 542 is shown as a single, continuous Fourdrinier wire. It will be understood that any of the various twin wire formers known in the art can be used.

It is anticipated that wood pulp in all its varieties will normally comprise the paper making fibers used in this invention. However, other cellulose fibrous pulps, such as cotton liners, bagasse, rayon, etc., can be used and none are disclaimed. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

Both hardwood pulps and softwood pulps as well as blends of the two may be employed. The terms hardwood pulps as used herein refers to fibrous pulp derived from the woody substance of deciduous trees (angiosperms): wherein softwood pulps are fibrous pulps derived from the woody substance of coniferous trees (gymnosperms). Hardwood pulps such as eucalyptus having an average fiber length of about 1.00 millimeter are particularly suitable for tissue webs described hereinafter where softness is important, whereas northern softwood Kraft pulps having an average fiber length of about 2.5 millimeter are preferred where strength is required. Also applicable to the present invention are fibers derived from recycled paper, which may contain any or all of the above categories as well as other non-fibrous materials such as fillers and adhesives used to facilitate the original paper making.

The paper furnish can comprise a variety of additives, including but not limited to fiber binder materials, such as wet strength binder materials, dry strength binder materials, and chemical softening compositions. Suitable wet strength binders include, but are not limited to, materials such as polyamide-epichlorohydrin resins sold under the trade name of KYMENE® 557H by Hercules Inc., Wilmington, Del. Suitable temporary wet strength binders include but are not limited to modified starch binders such as NATIONAL STARCH® 78-0080 marketed by National Starch Chemical Corporation, New York, N.Y. Suitable dry strength binders include materials such as carboxymethyl cellulose and cationic polymers such as ACCO® 711. The ACCO® family of dry strength materials are available from American Cyanamid Company of Wayne, N.J.

Preferably, the paper furnish deposited on the forming wire comprises a debonding agent to inhibit formation of some fiber to fiber bonds as the web is dried. The debonding agent, in combination with the energy provided to the web by the-dry creping process, results in a portion of the web being debulked. In one embodiment, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Debulking of the web can result in voids 310 ( FIG. 16).

As a result, the web can be formed to have a relatively smooth surface for efficient drying on the Yankee. Yet, because of the rebulking at the creping blade, the dried web can also have differential density regions, including a continuous network relatively high density region, and discrete relatively low density regions which are created by the creping process.

Suitable debonding agents include chemical softening compositions such as those disclosed in U.S. Pat. No. 5,279,767 issued Jan. 18, 1994 to Phan et al. Suitable biodegradable chemical softening compositions are disclosed in U.S. Pat. No. 5,312,522 issued May 17, 1994 to Phan et al. U.S. Pat. Nos. 5,279,767 and 5,312,522 are incorporated herein by reference. Such chemical softening compositions can be used as debonding agents for inhibiting fiber to fiber bonding in one or more layers of the fibers making up the web.

One suitable softener for providing debonding of fibers in one or more layers of fibers forming the web 20 is a papermaking additive comprising DiEster Di(Touch Hardened) Tallow Dimethyl Ammonium Chloride. A suitable softener is ADOGEN® brand papermaking additive available from Witco Company of Greenwich, Conn.

The embryonic web 543 is preferably prepared from an aqueous dispersion of papermaking fibers, though dispersions in liquids other than water can be used. The fibers are dispersed in the carrier liquid to have a consistency of from about 0.1 to about 0.3 percent. The percent consistency of a dispersion, slurry, web, or other system is defined as 100 times the quotient obtained when the weight of dry fiber in the system under consideration is divided by the total weight of the system. Fiber weight is always expressed on the basis of bone dry fibers.

The embryonic web 543 can be formed in a continuous papermaking process, as shown in FIG. 9A, or alternatively, a batch process, such as a handsheet making process can be used. After the dispersion of papermaking fibers is deposited onto the forming belt 542, the embryonic web 543 is formed by removal of a portion of the aqueous dispersing medium by techniques well known to those skilled in the art. The embryonic web is generally monoplanar, and is formed to have substantially smooth, macroscopically monoplanar first and second faces using any suitable forming belt 542.

Vacuum boxes, forming boards, hydrofoils, and the like are useful in effecting water removal from the dispersion. The embryonic web 543 travels with the forming belt 542 about a return roll 502 and is brought into the proximity of the web support apparatus 200.

The next step in making the paper structure 20 comprises transferring the embryonic web 543 from the forming belt 542 to the apparatus 200 and supporting the transferred web (designated by numeral 545 in FIG. 9B) on the first side 202 of the apparatus 200. The embryonic web preferably has a consistency of between about 5 and about 20 percent at the point of transfer to the apparatus 200.

The web is transferred to the apparatus 200 such that the first face 547 of the transferred web 545 is supported on and conformed to the surface 202 of the apparatus 200, with parts of the web 545 supported on the surface 260 and parts of the web supported on the felt surface 230. The second face 549 of the web is maintained in a substantially smooth, macroscopically monoplanar configuration. Referring to FIG. 9B, the elevation difference between the surface 260 and the surface 230 of the web support apparatus 200 is sufficiently small that the second face of the embryonic web remains substantially smooth and macroscopically monoplanar when the web is transferred to the apparatus 200. In particular, the difference in elevation between the surface 260 and the surface 230 should be smaller than the thickness of the embryonic web at the point of transfer.

The steps of transferring the embryonic web 543 to the apparatus 200 can be provided, at least in part, by applying a differential fluid pressure to the embryonic web 543. For instance, the embryonic web 543 can be vacuum transferred from the forming belt 542 to the apparatus 200 by a vacuum source 600 depicted in FIG. 9A, such as a vacuum shoe or a vacuum roll. One or more additional vacuum sources 620 can also be provided downstream of the embryonic web transfer point to provide further dewatering.

The web 545 is carried on the apparatus 200 in the machine direction (MD in FIG. 9A) to a nip 800 provided between a vacuum pressure roll 900 and a hard surface 875 of a heated Yankee dryer drum 880. Referring to FIG. 9C, a steam hood 2800 is positioned just upstream of the nip 800. The steam hood 2800 directs steam onto the surface 549 of the web 545 as the surface 547 of the web 545 is carried over a vacuum providing portion 920 of the vacuum pressure roll 900.

The steam hood 2800 is mounted opposite a section of the vacuum providing portion 920. The vacuum providing portion 920 draws the steam into the web 545 and the felt layer 220. The steam provided by steam hood 2800 heats the water in the paper web 545 and the felt layer 220, thereby reducing the viscosity of the water in the web and the felt layer 220. Accordingly, the water in the web and the felt layer 220 can be more readily removed by the vacuum provided by roll 900.

The steam hood 2800 can provide about 0.3 pound of saturated steam per pound of dry fiber at a pressure of less than about 15 psi. The vacuum providing portion 920 provides a vacuum of between about 1 and about 15 inches of Mercury, and preferably between about 3 and about 12 inches of Mercury at the surface 204. A suitable vacuum pressure roll 900 is a suction pressure roll manufactured by Winchester Roll Products. A suitable steam hood 2800 is a model D5A manufactured by Measurex-Devron Company of North Vancouver, British Columbia, Canada.

The vacuum providing portion 920 is in communication with a source of vacuum (not shown). The vacuum providing portion 920 is stationary relative to the rotating surface 910 of the roll 900. The surface 910 can be a drilled or grooved surface through which vacuum is applied to the surface 204. The surface 910 rotates in the direction shown in FIG. 9C. The vacuum providing portion 920 provides a vacuum at the surface 204 of the web support apparatus 200 as the web and apparatus 200 are carried through the steam hood 2800 and through the nip 800. While a single vacuum providing portion 920 is shown, in other embodiments it may be desirable to provide separate vacuum providing portions, each providing a different vacuum at the surface 204 as the apparatus 200 travel around the roll 900.

The Yankee dryer typically comprises a steam heated steel or iron drum. Referring to FIG. 9C, the web 545 is carried into the nip 800 supported on the apparatus 200, such that the substantially smooth second face 549 of the web can be transferred to the surface 875. Upstream of the nip, prior to the point where the web is transferred to the surface 875, a nozzle 890 applies an adhesive to the surface 875.

The adhesive can be a polyvinyl alchohol based adhesive. Alternatively, the adhesive can be CREPTROL® brand adhesive manufactured by Hercules Company of Wilmington, Del. Other adhesives can also be used. Generally, for embodiments where the web is transferred to the Yankee drum 880 at a consistency greater than about 45 percent, a polyvinyl alchohol based creping adhesive can be used. At consistencies lower than about 40 percent, an adhesive such as the CREPTROL® adhesive can be used.

The adhesive can be applied to the web directly, or indirectly (such as by application to the Yankee surface 875), in a number of ways. For instance, the adhesive can be sprayed in micro-droplet form onto the web, or onto the Yankee surface 875. Alternatively, the adhesive could also be applied to the surface 875 by a transfer roller or brush. In yet another embodiment, the creping adhesive could be added to the paper furnish at the wet end of the papermachine, such as by adding the adhesive to the paper furnish in the headbox 500. From about 2 pounds to about 4 pounds of adhesive can be applied per ton of paper fibers dried on the Yankee drum 880.

As the web is carried on the apparatus 200 through the nip 800, the vacuum providing portion 920 of the roll 900 provides a vacuum at the surface 204 of the web support apparatus 200. Also, as the web is carried on the apparatus 200 through the nip 800, between the vaccuum pressure roll 900 and the dryer surface 800, the web patterning layer 250 of the web support apparatus 200 imparts the pattern corresponding to the surface 260 to the first face 547 of the web 545. Because the second face 549 is a substantially smooth, macroscopically monoplanar face, substantially all of the of the second surface 549 is positioned against, and adhered to, the dryer surface 875 as the web is carried through the nip 800. As the web is carried through the nip, the second face 549 is supported against the smooth surface 875 to be maintained in a substantially smooth, macroscopically monoplanar configuration. Accordingly, a predetermined pattern can be imparted to the first face 547 of the web 545, while the second face 549 remains substantially smooth. The web 545 preferably has a consistency of between about 20 percent and about 60 percent when the web 545 is transferred to the surface 875 and the pattern of surface 260 is imparted to the web.

As the web is carried through the nip 800, it is believed that the heated surface 875 can boil the water in the web 545. It is believed that the vacuum provided by the vacuum pressure roll 900 draws the boiling water from the web through the portions of the felt layer 220 which are not covered by the web imprinting layer 250.

Without being limited by theory, it is believed that, as a result of having substantially all of the second face 549 positioned against the Yankee surface 875, drying of the web 545 on the Yankee is more efficient than would be possible with a web which has only selective portions of the second face against the Yankee. In particular, it is believed that by positioning substantially all of the second face 549 against the Yankee surface 875, the above described patterned paper having both bulk and smoothness and having a basis weight of at least about 8 lbs per 3000 square feet, and preferably at least about 10 lbs per 3000 square feet, can be dried on the Yankee drum 880 from a consistency of less than about 50 percent, and more preferably less than about 30 percent, to a consistency of at least about 90 percent, and more preferably at least about 95 percent, while removing water at a water removal rate of at least about 11 tons of water per hour at a web speed of at least about 4500 feet/minute, and more preferably at least about 5000 feet/minute.

In particular, it is believed that the present invention permits a web 545 having a basis weight of at least about 8 pounds per 3000 square feet, and more preferably at least about 10 pounds per 3000 square feet, to be dried from a relatively low consistency to a relatively high consistency on the Yankee drum at a Yankee drum speed of at least about 4500 feet per minute. In particular, it is believed that the present invention permits a web 545 having the above basis weight characteristics to be dried from a consistency of less than about 30 percent and more preferably less than about 25 percent (when the web is transferred to the drum 880), to a consistency of at least about 90 percent, and more preferably at least about 95 percent (when the web is removed from the drum by creping) at a web speed of at least about 4500 feet per minute, more preferably at least about 5000 feet per minute, and most preferably at least about 6000 feet per minute on the Yankee drum.

In comparison, it is believed that the Yankee dryer speed for drying paper having a continuous network and discrete domes as disclosed in U.S. Pat. No. 4,637,859 and a basis weight of at least about 10 pounds per 3000 square feet cannot be as high as 3500 ft/min if the paper is to be dried from a consistency from about 30 percent to about 90 percent on the Yankee drum. Typically, paper of the type shown in U.S. Pat. No. 4,637,859 is predried upstream of the Yankee drum to have a consistency upon transfer to the Yankee drum of about 60 percent to about 70 percent. Without being limited by theory, it is believed that if paper of the type shown in U.S. Pat. No. 4,637,859 is dried without the use of a predrier, then the Yankee dryer speed is limited to less than about 3000 feet/min.

The final step in forming the paper structure 20 comprises creping the web 545 from the surface 875 with a doctor blade 1000, as shown in FIG. 9A. Without being limited by theory, it is believed that the energy imparted by the doctor blade 1000 to the web 545 bulks, or de-densifies, at least some portions of the web, especially those portions of the web which are not imprinted by the web patterning surface 260. Accordingly, the step of creping the web from the surface 875 with the doctor blade 1000 provides a web having a first, compacted, relatively thinner region corresponding to the pattern imparted to the first face of the web, and a second relatively thicker region. In general, the doctor blade has a bevel angle of about 25 degrees and is positioned with respect to the Yankee dryer to provide an impact angle of about 81 degrees.

The paper structure 20 shown in FIG. 2 exhibits for shortening due to creping in both the continuous region 30 and the discrete regions 50. The creping frequency in the region 30 is different than the creping region in the regions 50. Generally, the creping frequency in the regions 50 is lower than the creping frequency in the continuous network 30.

In an alternative embodiment, the web imprinting apparatus 200 can comprise a resin patterning layer 250 which defines a plurality of discrete web contacting top surfaces 260 joined to the dewatering felt layer 220, as shown in the plan view of FIG. 8C. In FIG. 8C, the web contacting felt surface 230 is in the form of a continuous network surrounding the discrete surfaces 260. Such an apparatus can be used to form a paper web according to the present invention, wherein the paper structure comprises a plurality of relatively thinner, discrete regions dispersed throughout a relatively thicker continuous network region.

Figure 14A:
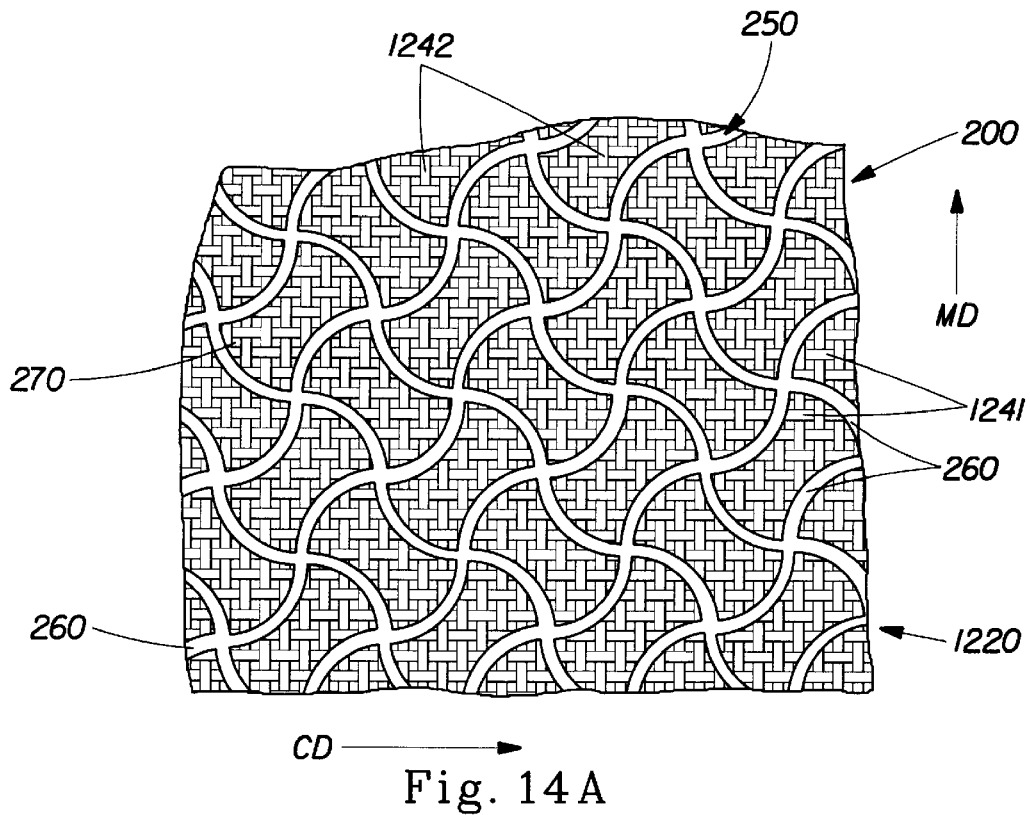
FIG. 14A is a plan view illustration of an apparatus for use in making a paper web of the type illustrated in FIG. 10, the apparatus comprising a web patterning layer joined to foraminous element formed of woven filaments.

In another alternative embodiment of the present invention, the web support apparatus 200 can comprise a resin layer disposed on a foraminous background element comprising a fabric of woven filaments. Referring to FIGS. 14A–15C, the apparatus 200 can comprise a resin layer 250 disposed on a woven fabric 1220. The resin layer 250 has a continuous network web contacting surface 260 defining discrete openings 270, as shown in FIG. 14A. The woven fabric 1220 comprises machine direction filaments 1242 and cross machine direction filaments 1241.

Figure 14B:
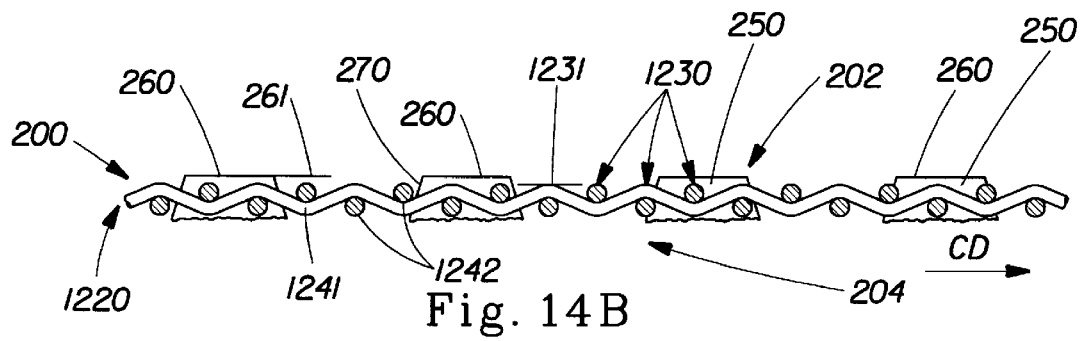
FIG. 14B is a cross-sectional illustration of the apparatus of FIG. 14.

In FIG. 14A and 14B, the first web contacting surface at a first elevation 1231 is provided by discrete knuckle surfaces 1230 located at cross-over points of the filaments 1241 and 1242. The top surfaces of the filaments 1241 and 1242 can be sanded or otherwise ground to provide relatively flat, generally oval shaped knuckle surfaces 1230 (detail of oval shapes not shown in FIG. 14A). The second web contacting surface is provided by the web patterning layer 250. The web patterning layer 250, which is joined to the woven fabric 1220, has a web contacting top surface 260 at a second elevation 261.

The difference between the first elevation 1231 and the second elevation 261 is less than about thickness of the paper web when the paper web is transferred to the web support apparatus 200. The continuous surface 260 and the discrete surfaces 1230 can be disposed at the same elevation, so that the elevations 1231 and 261 are the same. Alternatively, surface 260 can be slightly above the surfaces 1230, or surfaces 1230 can be slightly above surface 260.

The difference in elevation is greater than or equal to 0.0 mils and less than about 5.0 mils. In one embodiment, the difference in elevation is less than about 4.0 mils (0.10 mm), more preferably less than about 2.0 mils (0.05 mm), and most preferably less than about 1.0 mil (0.025 mm), in order to maintain a relatively smooth surface 24, as described below.

Figure 10:
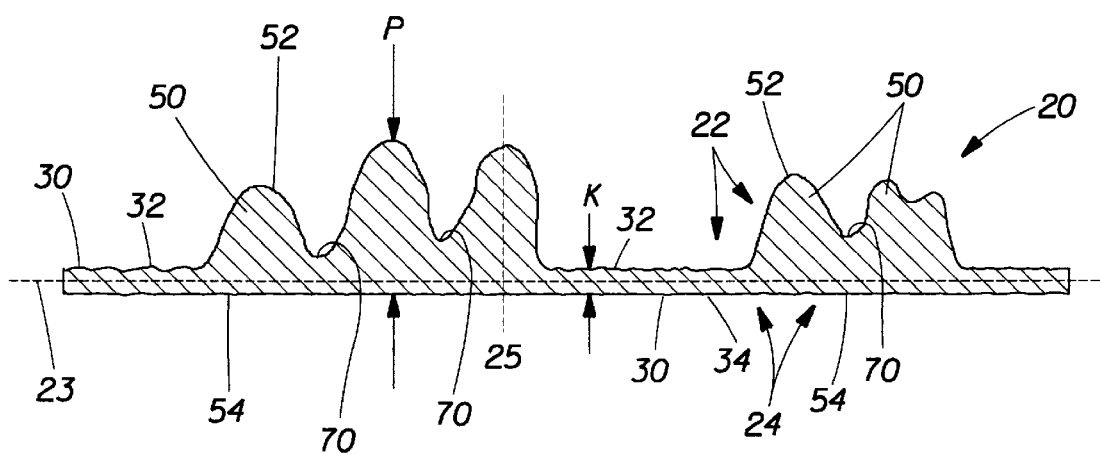
FIG. 10 is a cross-sectional illustration of a paper web made according to an alternative embodiment of the present invention and showing relatively thicker, discrete regions disposed in the plane of the continous network region, and wherein each discrete region encircles one or more discete densified region.

The web support apparatus 200 shown in FIGS. 14A and 14B can be used to form the paper web shown in FIGS. 10–13. Referring to FIG. 10, the paper web 20 comprises a continuous network, relatively thinner region 30 corresponding to the surface 260 and a plurality of discrete, relatively thicker regions 50 dispersed throughout the continuous network region 30. The regions 50 correspond to the openings 270 in the surface 260. Each of the relatively thicker regions 50 encircles at least one densified region 70. The densified regions 70 correspond to the surfaces 1230 of the woven fabric 1220.

Figure 11:
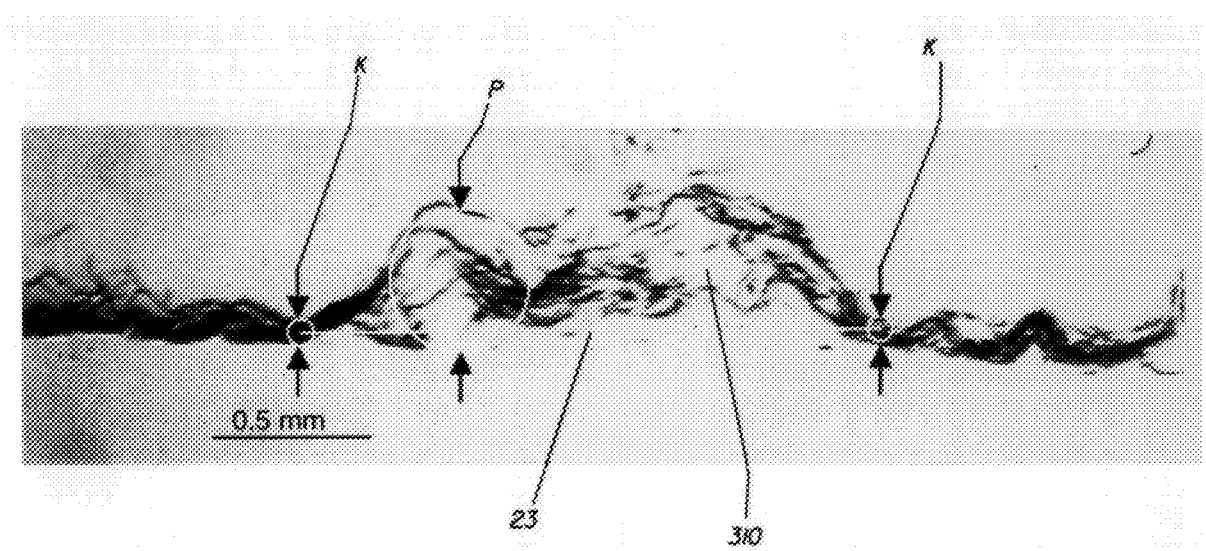
FIG. 11 is a photomicrograph of a cross-section of a paper structure of the type illustrated in FIG. 10.
Figure 12:
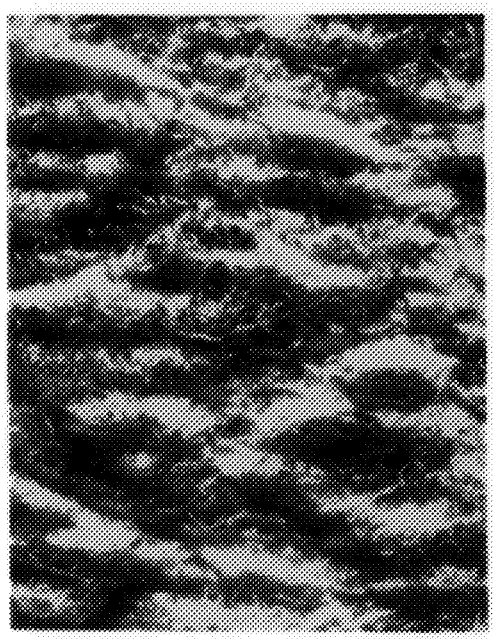
FIG. 12 a photograph of the first surface of a paper structure of the type illustrated in FIG. 10.
Figure 13:
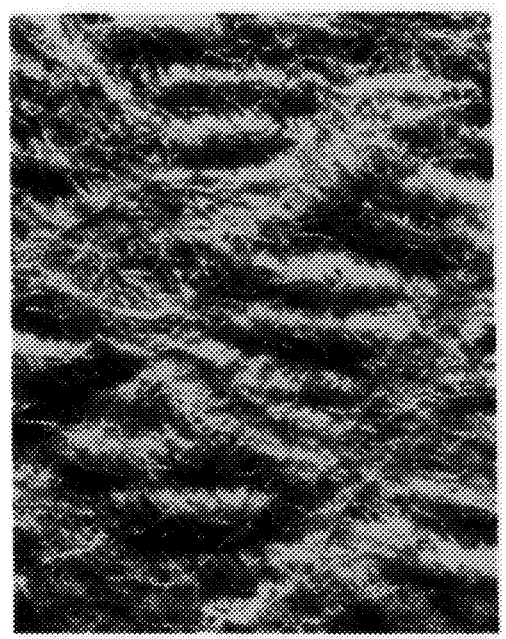
FIG. 13 is a photograph of the second surface of a paper structure of the type illustrated in FIG. 10.

Referring to FIG. 11, P can be at least about 0.35 mm, and preferably at least about 0.44 mm. K can be less than about 0.20 mm, and more preferably less than about 0.10 mm.

Figure 15A:
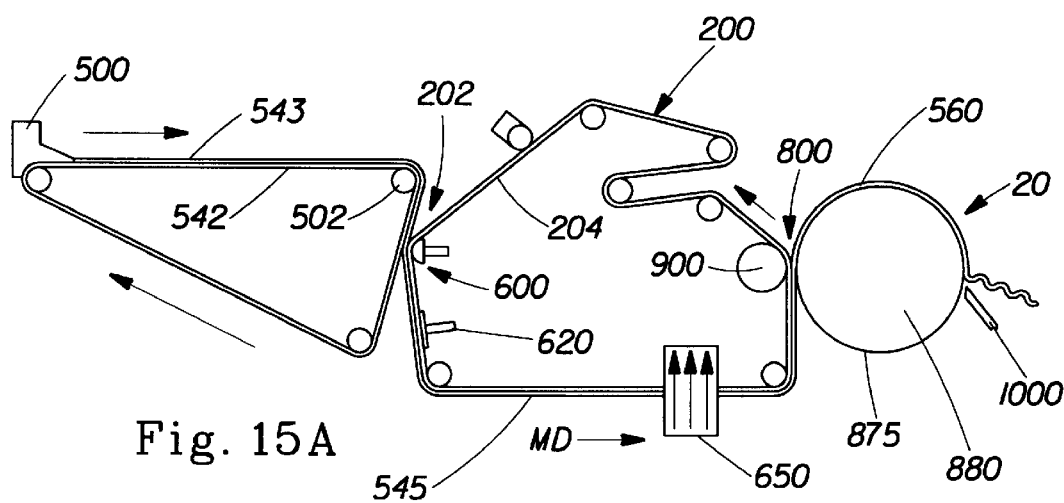
FIG. 15A is an illustration of a papermachine for making a paper web with the apparatus of FIGS. 14A and 14B.
Figure 15B:
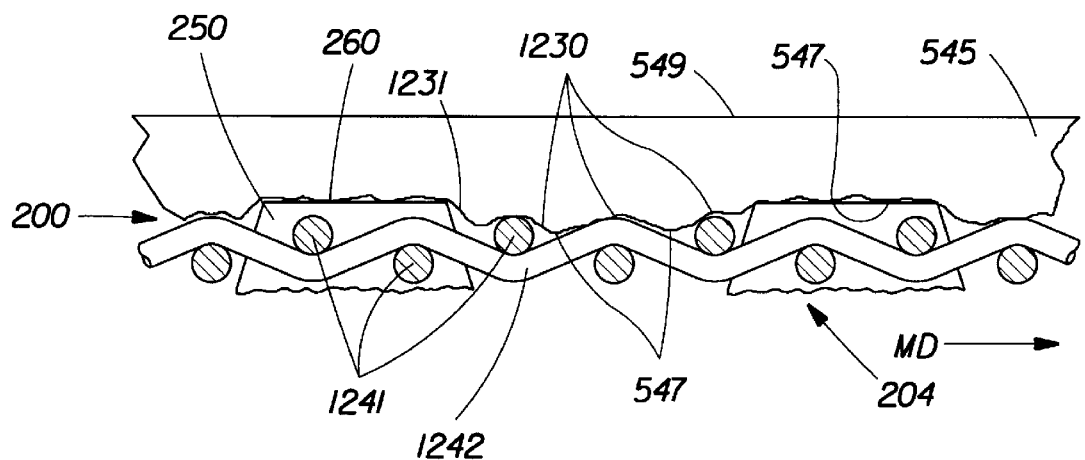
FIG. 15B is an illustration showing a paper web transferred to the apparatus shown in FIG. 14B to form a paper web having a first surface conformed to the apparatus and a second substantially smooth surface.
Figure 15C:
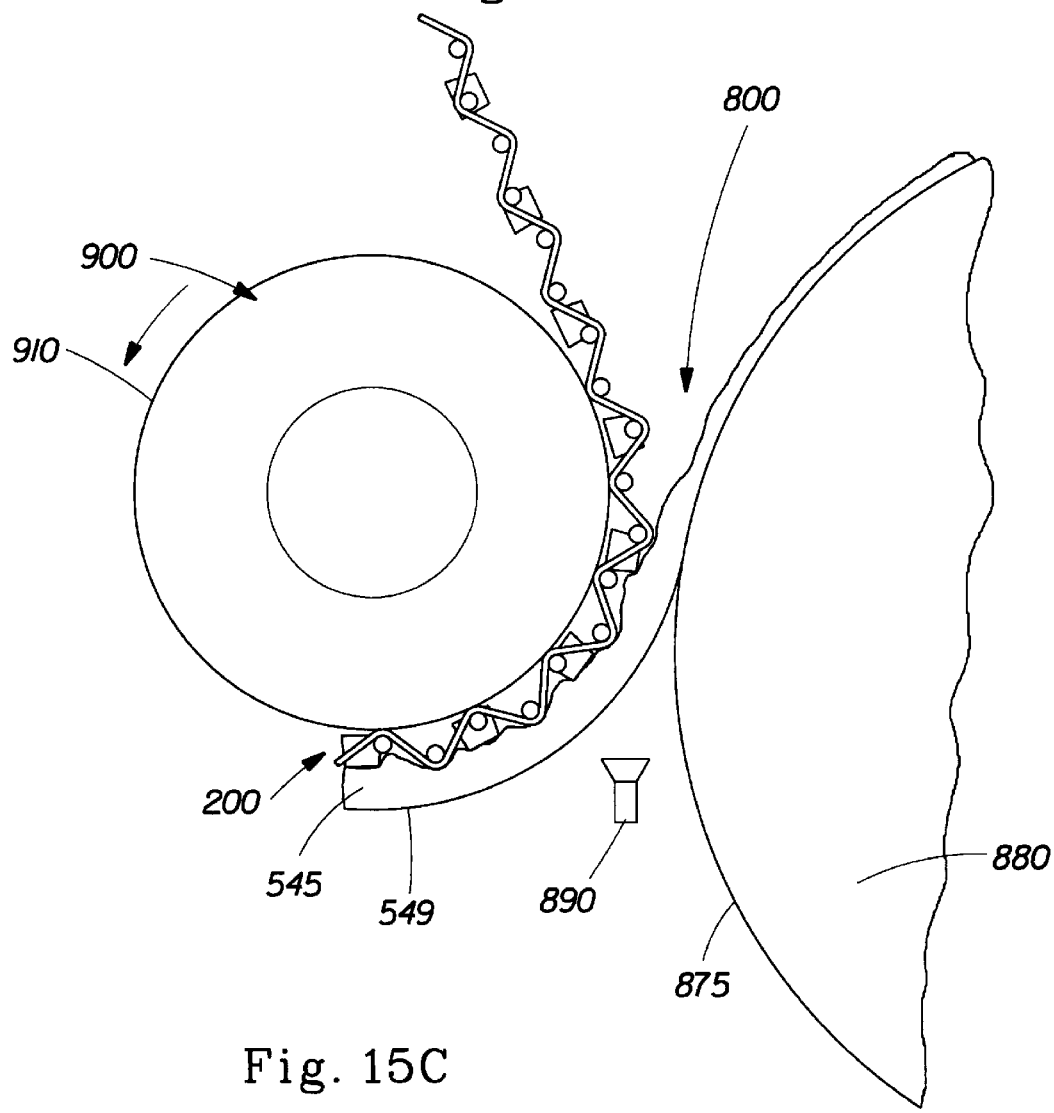
FIG. 15C is an illustration of a paper web on the apparatus shown in FIG. 14B being carried between a pressure roll and a Yankee drying drum to impart a pattern to the first surface of the paper web and to adhere the second surface of the paper web to the Yankee drum.

FIGS. 15A–15C illustrate formation of the web 20 shown in FIG. 10 using the web support apparatus 200. As described above with respect to FIGS. 9A–9C, an embryonic web 543 having first and second smooth surfaces is formed on a forming wire 542 and transferred to the web support apparatus 200. The web 543 is vacuum transferred to the apparatus 200, to provide a web 545 supported on the apparatus 200. As shown in FIG. 15B, the first surface 547 is conformed to the surface 260 and the surfaces 1230, and the second surface 549 is maintained as a substantially smooth, macroscopically monoplanar surface.

In contrast to FIGS. 9A–9C, the web 545 and web support apparatus 200 are next carried through a through air drying apparatus 650, wherein heated air is directed through the web 545 while the web 545 is supported on the apparatus 200. The heated air is directed to enter the surface 549 and to pass through the web 545 and then through the apparatus 200.

The through air drying apparatus 650 can be used to dry the web 545 to a consistency of from about 30 percent to about 70 percent. U.S. Pat. No. 3,303,576 to Sisson and U.S. Pat. No. 5,247,930 issued to Ensign et al. are incorporated herein by reference for the purpose of showing suitable through air dryers for use in the practice of the present invention.

The partially dried web 545 and the apparatus 200 are directed to pass through a nip 800 formed between a pressure roll 900 and a Yankee drum 880. The continuous network surface 260 and the discrete surfaces 1230 are impressed into the surface 547 of the web 545 as the web is carried through the nip 800. An adhesive supplied by nozzle 890 is used to adhere substantially all of the substantially smooth surface 549 to the surface 875 of the heated Yankee drum 880.

Figure 16:
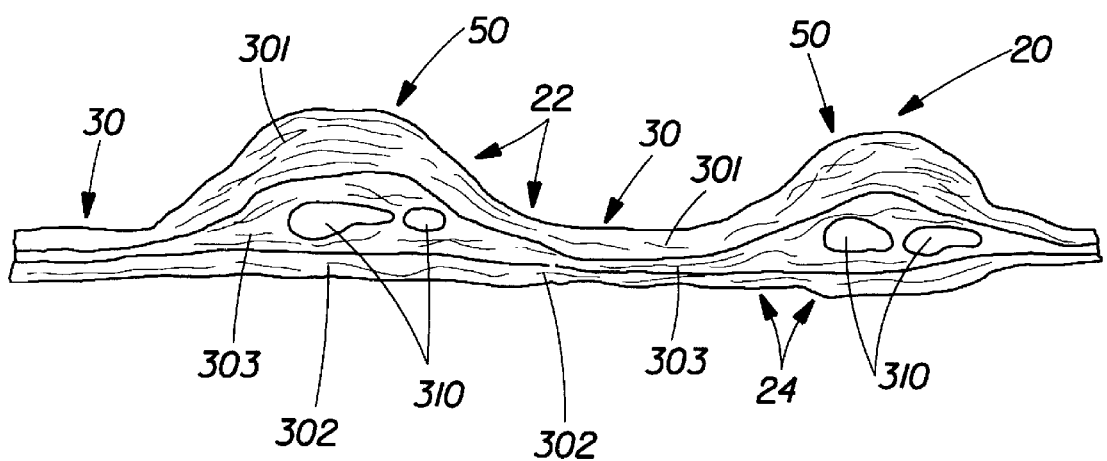
FIG. 16 is a cross-sectional illustration of a paper web made according to one embodiment of the present invention, wherein the web comprises multiple fiber layers including a debonding layer.

FIG. 16 is a cross-sectional illustration of a paper web 20 showing a paper web according to an embodiment of the invention, wherein the paper web has three fiber layers designated 301, 302, and 303. A paper web having a layered structure can be made using the papermaking equipment and methods illustrated in FIGS. 8A,B and 9A–C, or alternatively, those illustrated in FIGS. 14A,B and 15A–C.

While a single forming wire 542 is shown in FIG. 9A, it will be understood that other forming wire configurations can be used in combination with one or more headboxes, each headbox having a a capability of providing one or more layers of fiber furnish, in order to provide a multiple layer web. U.S. Pat. No. 3,994,771 issued to Morgan et al. and U.S. Pat. No. 4,300,981 issued to Carstens et al. and commonly assigned U.S. patent application "Layered Tissue Having Improved Functional Properties" filed Oct. 24, 1996 in the names of Phan and Trokhan disclose layering and are incorporated by reference herein. Various types of forming wire configurations, including twin wire former can be used. Additionally, various types of headbox designs can be employed to provide a web having one or more fiber layers Referring to FIG. 16, one or more headboxes can be used to deliver three layers of furnish corresponding to layers 301, 302, and 303 onto the forming wire 542, such that the embryonic web comprises the layers 301, 302, and 303. The first layer 301 can comprise relatively long papermaking fibers disposed adjacent the first surface 22 of the web. The relatively long papermaking fibers in the first layer 301 can comprise softwood fibers such as Northern Softwood fibers having an average fiber length of about 3 millimeters or more. The second layer 302 can comprise relatively short papermaking fibers disposed adjacent the second surface 24 of the web. The relatively short papermaking fibers in the second layer 302 can comprise hardwood fibers such as Eucalyptus fibers having an average fiber length of about 1.5 millimeters or less.

The third layer 303 is disposed intermediate the first and second layers 301 and 302. The third layer can be a debonding layer characterized in having a void spaces 310 having substantially no fibers therein. Such void spaces are shown in the photomicrograph of FIGS. 3 and 11.

In particular, the void spaces can be located in the relatively thicker regions 50. The third layer can comprise a debonding agent, such as ADOGEN® brand additive, to reduce fiber to fiber bonds in the third layer 303, thereby facilitating opening of the fiber structure in layer 303 to provide the void spaces 310. The third layer 303 can comprise softwood fibers, hardwood fibers, or a combination of hardwood and softwood fibers.

In yet another embodiment, the layers 301 and 302 can each comprise relatively short hardwood fibers, and the third layer 303 can comprise relatively long softwood fibers. For instance, the layers 301 and 302 can each be predominately formed of Eucalyptus fibers, and the third layer 303 can be predominately formed of relatively long Northern Softwood fibers.

Alternatively, other methods can be employed to facilitate debulking of the web or debonding of fibers intermediate outer layers of the web. U.S. Pat. No. 4,225,382 to Kearney et al. is incorporated herein by reference for the purpose of disclosing multiple layer webs comprised of well bonded layers separated by an interior layer.

EXAMPLES

All percentages are weight percentages based on dry fiber weight unless otherwise indicated.

Example 1

This examples provides a 3 layer tissue web made with the papermaking apparatus shown in FIGS. 14A,B and 15A–C.

A 3% by weight aqueous slurry of NSK is made up in a conventional re-pulper. A 2% by weight aqueous solution of the (i.e., dry wet strength resin (i.e., National starch 78-0080 marketed by National Starch and Chemical corporation of New-York, N.Y.) is added to the NSK stock pipe at a rate of 0.2% by weight of the dry fibers (Ratio of weight of wet strength resin to dry fiber weight is 0.002). The NSK slurry is diluted to about 0.2% consistency at the fan pump. Second, a 3% by weight aqueous slurry of Eucalyptus fibers is made up in a conventional re-pulper. A 2% by weight aqueous solution of the debonder (i.e., ADOGEN® 442) is added to the Eucalyptus stock pipe at a rate of 0.1% by weight of the dry fibers. The Eucalyptus slurry is diluted to about 0.2% consistency at the fan pump.

Three individually treated furnish streams (stream 1=100% NSK; stream 2=100% Eucalyptus; stream 3=100% Eucalyptus) are kept separate through the headbox and deposited onto a Fourdrinier wire to form a three layer embryonic web containing two outer Eucalyptus layers and a middle NSK layer. Dewatering occurs through the Fourdrinier wire and is assisted by a deflector and vacuum boxes. The Fourdrinier wire is of a 5-shed, satin weave configuration having 110 machine-direction and 95 cross-machine-direction monofilaments per inch, respectively.

The embryonic wet web is vacuum transferred from the Fourdrinier wire, at a fiber consistency of about 8% at the point of transfer, to the web support apparatus 200 having a foraminous background element comprising a woven fabric 1220 and a web patterning layer 250 made of photosensitive resin. A pressure differential of about 16 inches of mercury is used to transfer the web to the web support apparatus 200. The foraminous background element is of a 5-shed, satin weave configuration having 68 machine-direction and 51 cross-machine-direction monofilamnents per inch, the machine direction filaments having a diameter of about 0.22 mm and the cross-machine direction filaments having a diameter of about 0.29 mm. Such a foraminous background element is manufactured by Appleton Wire Company, Appleton, Wis.

The web patterning layer 250 has continuous network web contacting surface 260 with a projected area which is between about 30 and about 40 percent of the projected area of the apparatus 200. The difference between elevation 1231 of the web contacting surface of the foraminous background element and the elevation 261 of the continuous network web contacting surface 260 is about 0.001 inch (0.0254 mm).

The web is transferred to the apparatus 200 to provide a web 545 supported on the apparatus 200 and having a substantially smooth second surface 549, as shown in FIG. 15B. Further de-watering is accomplished by vacuum assisted drainage and by through air drying, as represented by devices 600, 620, and 650, until the web has a fiber consistency of about 65%.

Transfer to the Yankee dryer at the nip 800 is effected with a pressure roll 900. The surface 250 and the surfaces 1230 are imprinted on the first surface 547 of the web 545 to provide a patterned surface 547. Substantially all of the second surface 549 is adhered to the surface 875 of the a Yankee dryer drum 880 using a polyvinyl alcohol based creping adhesive. The nip pressure in nip 800 is at least about 400 pli.

The web consistency is increased to between about 90% and 100% before dry creping the web from the surface 875 with a doctor blade 1000. The doctor blade has a bevel angle of about 25 degrees and is positioned with respect to the Yankee dryer to provide an impact angle of about 81 degrees; the Yankee dryer is operated at about 800 fpm (feet per minute) (about 244 meters per minute). The dry web is formed into roll at a speed of 650 fpm (200 meters per minutes).

The web made according to the above procedure is converted into a three-layer, one-ply toilet tissue paper. The one-ply toilet tissue paper has a basis weight of about 17.5 pounds per 3000 square feet, contains about 0.02% by weight of the temporary wet strength resin, and about 0.01 % by weight of the debonder.

Importantly, the resulting one-ply tissue paper is soft , absorbent and, suitable for use as toilet tissue. The one ply tissue web has the following characteristics:

Basis Weight: 17.5 lb/3000 sq ft. (28.5 gm/sq. meter)

Macro-Caliper: 13.6 mils (0.0136 inches)

Bulk Density: 0.08 gram/cubic centimeter

Surface Smoothness of surface 22: 890

Surface Smoothness of surface 24: 1070

Smoothness Ratio: 1.20

Example 2

This example provides a 2 layer tissue web made with the papermaking apparatus shown in FIGS. 14A,B and 15A–C.

A 3% by weight aqueous slurry of NSK is made up in a conventional repulper. A 2% solution of a temporary wet strength resin (e.g. PAREZ® 750 marketed by American Cyanamid Company of Stanford, Conn.) is added to the NSK stock pipe at a rate of 0.2% by weight of the dry fibers. The NSK slurry is diluted to about 0.2% consistency at the fan pump. Second, a 3% by weight aqueous slurry of Eucalyptus fibers is made up in a conventional re-pulper. A 2% solution of the debonder (i.e., ADOGEN® 442 marketed by Witco Corporation of Dublin, Ohio) is added to the Eucalyptus stock pipe at a rate of 0.1% by weight of the dry fibers. The Eucalyptus slurry is diluted to about 0.2% consistency at the fan pump.

The two furnish streams (stream 1=100% NSK/stream 2=100% Eucalyptus) are mixed in the headbox and deposited onto a Fourdrinier wire 542 to form an embryonic web containing NSK and Eucalyptus fibers. Dewatering occurs through the Fourdrinier wire and is assisted by a deflector and vacuum boxes. The Fourdrinier wire is of a 5-shed, satin weave configuration having 110 machine-direction and 95 cross-machine-direction monofilaments per inch, respectively.

The embryonic wet web is transferred from the Fourdrinier wire, at a fiber consistency of about 8% at the point of transfer, to a web support apparatus 200 comprising a woven fabric 1220 and a web patterning layer 250 having a continuous network surface 260.

The embryonic wet web is transferred from the Fourdrinier wire, at a fiber consistency of about 8% at the point of transfer, to the apparatus 200, to provide a web 545 having a substantially smooth, macroscopically monoplanar surface 549 and a surface 547 which conforms to the surfaces 1230 and the surface 260. A pressure differential of about 16 inches of mercury is used to transfer the web to the 200. The woven fabric 1220 is of a 3-shed, satin weave configuration having 79 machine-direction and 67 cross-machine-direction monofilaments per inch, the machine direction filaments having a diameter of about 0.18 mm and the crossmachine direction filaments having a diameter of about 0.21 mm. Such a foraminous background element is manufactured by Appleton Wire Company, Appleton, Wis.

The web patterning layer 250 has web contacting top surface 260 having a projected area which is between about 30 and about 40 percent of the projected area of the apparatus 200. The difference between the elevation 1231 of the web contacting surface 1230 and the elevation 261 of the surface 260 is about 1 mil (0.001 inch, 0.0254 mm).

Further de-watering of the web 545 is accomplished by vacuum assisted drainage and by though air drying, as represented by devices 600, 620, and 650, until the web has a fiber consistency of about 65%. Transfer to the Yankee dryer is effected at the nip 800 formed between a pressure roll 900 and the Yankee dryer drum 880.

The surface 250 and the surfaces 1230 are imprinted on the first surface 547 of the web 545 to provide a patterned surface 547. Substantially all of the second surface 549 is adhered to the surface 875 of the a Yankee dryer drum 880 using a polyvinyl alcohol based creping adhesive. The nip pressure in nip 800 is at least about 400 pli.

The web consistency is increased to between about 90% and 100% before dry creping the web with a doctor blade 1000. The doctor blade has a bevel angle of about 25 degrees and is positioned with respect to the Yankee dryer to provide an impact angle of about 81 degrees; the Yankee dryer is operated at about 800 fpm (feet per minute) (about 244 meters per minute). The dry web is formed into roll at a speed of 650 fpm (200 meters per minutes).

The web is converted to provide a two-ply bath tissue paper. Each ply has a basis weight of about 12.8 pounds per 3000 square feet and contains about 0.02% of the temporary wet strength resin and about 0.01% of the debonding agent. The resulting two-ply tissue paper is soft, absorbent and suitable for use as bath tissue. Each ply has the following properties:

Basis Weight: 12.8 lb/3000 sq ft (20.8 gm/sq. meter).
Macro-Caliper: 11.4 mils
Bulk Density: 0.07 gram/cubic centimeter
Surface Smoothness of surface 22: 850
Surface Smoothness of surface 24: 1006
Smoothness Ratio: 1.18

Example 3

This example provides a 2 ply tissue paper, each ply having 3 layers, and each ply made with papermaking apparatus of the type shown in FIGS. 8A,B and 9A–C.

A 3% by weight aqueous slurry of Northern Softwood Kraft (NSK) fibers is made using a conventional re-pulper. A 2% solution of the temporary wet strength resin (i.e., National Starch 78-0080 marketed by National Starch and Chemical corporation of New-York, N.Y.) is added to the NSK stock pipe at a rate of 0.2% by weight of the dry fibers. The NSK slurry is diluted to about 0.2% consistency at the fan pump. Second, a 3% by weight aqueous slurry of Eucalyptus fibers is made up using a conventional re-pulper. A 2% solution of the debonder (i.e., ADOGEN® 442 marketed by Witco Corporation of Dublin, Ohio) is added to one of the Eucalyptus stock pipe at a rate of 0.1% by weight of the dry fibers. The Eucalyptus slurry is diluted to about 0.2% consistency at the fan pump.

Three individually treated furnish streams (stream 1=100% NSK; stream 2 =100% Eucalyptus coated with debonder; stream 3=100% Eucalyptus) are kept separate through the headbox and deposited onto a Fourdrinier wire to form a three layer embryonic web containing an outer Eucalyptus layer, a debonded Eucalyptus layer and an NSK layer. Dewatering occurs through the Fourdrinier wire and is assisted by a deflector and vacuum boxes. The Fourdrinier wire is of a 5-shed, satin weave configuration having 110 machine-direction and 95 crossmachine-direction monofilaments per inch, respectively.

The embryonic wet web is transferred from the Fourdrinier wire, at a fiber consistency of about 8% at the point of transfer, to a web support apparatus 200 having a dewatering felt layer 220 and a photosensitive resin web patterning layer 250.

The dewatering felt 220 is a Amflex 2 Press Felt manufactured by Appleton Mills of Appleton, Wis. The felt 220 comprises a batt of polyester fibers. The batt has a surface denier of 3, a substrate denier of 10–15. The felt layer 220 has a basis weight of 1436 gm/square meter, a caliper of about 3 millimeter, and an air permeability of about 30 to about 40 scfm.

The web patterning layer 250 comprises a continuous network web contacting surface 260 having an projected area of about 30 to about 40 percent of the projected area of the web support apparatus 200. The difference between the elevation 261 of the surface 260 and the elevation 231 of the felt surface 230 is about 0.005 inch (0.127 millimeter).

The embryonic web is transferred to the apparatus 200 to provide a web 545 supported on the apparatus 200 and having a macroscopically monoplanar, substantially smooth surface 549. Transfer is provided at the vacuum transfer point with a pressure differential of about 20 inches of Mercury.

Further de-watering is accomplished by vacuum assisted drainage, such as by apparatus 620, until the web has a fiber consistency of about 25%. The web 545 is then carried adjacent the steam hood 2880 and into the nip 800 formed between a vacuum pressure roll 900 and the Yankee dryer drum 880.

The surface 260 is imprinted into the surface 547 of the web 545 at the nip 800 by pressing the web 545 and the web support apparatus 200 between the vacuum pressure roll 900 and the Yankee dryer drum 880 at a nip pressure of about 400 pli. A creping adhesive is used to adhere the web to the Yankee dryer. The fiber consistency is increased to at least about 90% before dry creping the web with a doctor blade. The doctor blade has a bevel angle of about 25 degrees and is positioned with respect to the Yankee dryer to provide an impact angle of about 81 degrees; the Yankee dryer is operated at about 800 fpm (feet per minute) (about 244 meters per minute). The dry web is formed into roll at a speed of 650 fpm.

The web is converted into a two-ply bath facial tissue paper, each ply comprising three fiber layers. The two-ply toilet tissue paper contains about 1.0% of the temporary wet strength resin and about 0.1% of the debonder.

Each ply has the following properties:

Basis Weight: 9.8 lb per 3000 sq. ft (15.9 gm/square meter)
Macro-Caliper: 6 mils
Bulk Density: 0.10 grams/cubic centimeter
Surface Smoothness of surface 22: 740
Surface Smoothness of surface 24: 960
Smoothness Ratio: 1.30

Example 4

This example provides a tissue web made with the papermaking apparatus of the type shown in FIGS. 8A,B and 9A–C.

A 3% by weight aqueous slurry of Northern Softwood Kraft is made up in a conventional re-pulper. A 2% solution of the temporary wet strength resin (PAREZ® 750) is added to the NSK stock pipe at a rate of 0.2% by weight of the dry fibers. The NSK slurry is diluted to about 0.2% consistency at the fan pump. Second, a 3% by weight aqueous slurry of Eucalyptus fibers is made up using a conventional re-pulper. A 2% solution of the debonder (ADOGEN® 442) is added to the Eucalyptus stock pipe at a rate of 0.1% by weight of the dry fibers. The Eucalyptus slurry is diluted to about 0.2% consistency at the fan pump.

The two individually treated furnish streams (stream 1=100% NSK; stream 2=100% Eucalyptus) are mixed through the headbox and deposited onto a Fourdrinier wire to form a single-layer web of NSK fibers and coated Eucalyptus fibers, the Eucalyptus fibers being coated with debonder. Dewatering occurs through the Fourdrinier wire and is assisted by a deflector and vacuum boxes. The Fourdrinier wire is of a 5-shed, satin weave configuration having 110 machine-direction and 95 cross-machine-direction monofilaments per inch, respectively.

The embryonic wet web is transferred from the Fourdrinier wire, at a fiber consistency of about 8% at the point of transfer, to a web support apparatus 200 having a dewatering felt layer 220 and a photosensitive resin web patterning layer 250.

The dewatering felt 220 is a Amflex 2 Press Felt manufactured by Appleton Mills of Appleton, Wis. The web patterning layer 250 comprises a continuous web contacting surface 260. The web patterning layer 250 has a projected area equal to about 35 percent of the projected area of the web support apparatus 200. The difference in elevation between the top web contacting surface 260 and the first felt surface 230 is about 0.005 inch (0.127 millimeter).

The embryonic web is transferred to the web support apparatus 200 and deflected in a first deflection step to form a generally monoplanar web 545. Transfer is provided at the vacuum transfer point with a pressure differential of about 20 inches of mercury. Further de-watering is accomplished by vacuum assisted drainage until the web has a fiber consistency of about 25%. The web 545 is carried by the web support apparatus 200 adjacent to the steam hood 2800 and into the nip 800 formed between the vacuum pressure roll 900 and the Yankee drum 880. The web 545 is then compacted against the compaction surface 875 of the Yankee dryer drum 880 at a compression pressure of at least about 400 pli. A polyvinyl alcohol based creping adhesive is used to adhere the compacted web to the Yankee dryer. The fiber consistency is increased to at least about 90% before dry creping the web from the surface of the dryer drum 880 with a doctor blade. The doctor blade has a bevel angle of about 25 degrees and is positioned with respect to the Yankee dryer to provide an impact angle of about 81 degrees; the Yankee dryer is operated at about 800 fpm (feet per minute) (about 244 meters per minute). The dry web is formed into roll at a speed of 650 fpm (200 meters per minutes).

The web is converted to provide a single-layer, two-ply bath tissue paper. Each ply of the two-ply bath tissue paper has a basis weight about 12.6 pounds per 3000 square feet, and contains about 0.2% by weight of the temporary wet strength resin and about 0.1% by weight of the debonder. The resulting two-ply tissue paper is soft, absorbent, and is suitable for use as a bath tissue.

The tissue web has the following properties:

Basis Weight: 12.6 lb/3000 sq ft (20.5 gm/sq meter)
Macro-Caliper: 8.8 mils
Bulk Density: 0.092 gram/cubic centimeter
Surface Smoothness of surface 22: 890
Surface Smoothness of surface 24: 1050
Smoothness Ratio: 1.18

Prophetic Example

The following prophetic example illustrates a method of making 2 ply tissue paper using a commercial size papermaking equipment of the type shown in FIGS. 8A,B and 9A–C.

A 3% by weight aqueous slurry of Northern Softwood Kraft is made up in a conventional re-pulper. A 2% solution of the temporary wet strength resin (i.e., PAREZ® 750 marketed by American Cyanamid corporation of Stanford, Conn.) is added to the NSK stock pipe at a rate of 0.2% by weight of the dry fibers. The NSK slurry is diluted to about 0.2% consistency at the fan pump. Second, a 3% by weight aqueous slurry of Eucalyptus fibers is made up using a conventional re-pulper. A 2% solution of the debonder (i.e., Adogen® 442 marketed by Witco Corporation of Dublin, Ohio) is added to the Eucalyptus stock pipe at a rate of 0.1% by weight of the dry fibers. The Eucalyptus slurry is diluted to about 0.2% consistency at the fan pump.

The two individually treated furnish streams (stream 1=100% NSK; stream 2=100% Eucalyptus) are mixed through the headbox and deposited onto a Fourdrinier wire to form a single-layer web of NSK fibers and Eucalyptus fibers, the Eucalyptus fibers being coated with debonder. Dewatering occurs through the Fourdrinier wire and is assisted by a deflector and vacuum boxes. The Fourdrinier wire is of a 5-shed, satin weave configuration having 110 machine-direction and 95 cross-machine-direction monofilaments per inch, respectively.

The embryonic wet web is transferred from the Fourdrinier wire, at a fiber consistency of about 10% at the point of transfer, to a web support apparatus 200 having a dewatering felt layer 220 and a photosensitive resin web patterning layer 250.

The dewatering felt 220 is a Amflex 2 Press Felt manufactured by Appleton Mills of Appleton, Wis. The web patterning layer 250 comprises continuous web patterning layer 250 having about 69 bilaterally staggered, oval shaped openings 270 per square inch of the web contacting surface 220. The web patterning layer 250 has a projected area equal to about 35 percent of the projected area of the web support apparatus 200. The difference in elevation between the top web contacting surface 260 and the first felt surface 230 is about 0.005 inch (0.127 millimeter).

The embryonic web is transferred to the web support apparatus 200 to form a generally monoplanar web 545. Transfer is provided at the vacuum transfer point with a pressure differential of about 20 inches of mercury. Further de-watering is accomplished by vacuum assisted drainage until the web has a fiber consistency of about 30%. The web 545 is carried by the web support apparatus 200 to the nip 800. The vacuum pressure roll 900 has a compression surface 910 having a hardness of about 60 P&J. The web 545 is then compacted against the compaction surface 875 of the Yankee dryer drum 880 by pressing the web 545 and the web support apparatus 200 between the compression surface 910 and the Yankee dryer drum 880 surface at a compression pressure of at least about 400 pli. A polyvinyl alcohol based creping adhesive is used to adhere the compacted web to the Yankee dryer. The fiber consistency is increased to at least about 90% before dry creping the web from the surface of the dryer drum 880 with a doctor blade. The doctor blade has a bevel angle of about 20 degrees and is positioned with respect to the Yankee dryer to provide an impact angle of about 76 degrees; the Yankee dryer is operated at about 4500 fpm (feet per minute) (about 1372 meters per minute). The dry web is formed into roll at a speed of 3690 fpm (1125 meters per minute).

The web is converted to provide a two-ply bath tissue paper. Each ply of the two-ply bath tissue paper can have a basis weight about 12.5 pounds per 3000 square feet, and contains about 0.2% by weight of the temporary wet strength resin and about 0.1% by weight of the debonder. The resulting two-ply tissue paper is soft, absorbent, and is suitable for use as a bath tissue.

ANALYTICAL PROCEDURES

Measurement of Thickness and Elevation of Paper Features

The location of the plane 23 of the region 30, the thickness of the region 30 and the thickness of the region 50 are determined using photomicrographs of microtomed cross-sections of the paper web. An example of such a photomicrograph is shown in FIG. 3, where the location of plane 23 is indicated, along with the thickness P of region 50 and the thickness K of region 30.

Ten samples, each measuring about 2.54 by 5.1 centimeters (1 inch by 2 inch) are choosen randomly from a sheet or roll of tissue paper. If ten samples cannot be obtained from a single sheet, then additional sheets made under the same conditions (preferably the same parent roll) can be used.

Microtomes for each sample are made by stapling each sample onto a rigid cardboard holder. The cardboard holder is placed in a silicon mold. The paper sample is immersed in a resin such as Merigraph photopolymer manufactured by Hercules, Inc.

The sample is cured to harden the resin mixture. The sample is removed from the silicon mold. Prior to immersion in photopolymer the sample is marked with a reference point to accurately determine where microtome slices are made. Preferably, the same reference point is utilized in both the plan view (e.g. FIG. 4) and various sectional views (e.g. FIG. 3) of the sample of the web 20.

The sample is placed in a model 860 microtome sold by the American Optical Company of Buffalo, N.Y. and leveled. The edge of the sample is removed from the sample, in slices, by the microtome until a smooth surface appears.

A sufficient number of slices are removed from the sample, so that the various regions of the paper web (e.g. 30 and 50) may be accurately reconstructed. For the embodiment described herein, slices having a thickness of about 60 microns per slice are taken from the smooth surface. Multiple slices may be required so that the thicknesses P and K may be ascertained.

A sample slice is mounted on a microscope slide using oil and a cover slip. The slide and the sample are mounted in a light transmission microscope and observed at about 4× magnification. Photomicrographs are taken along the slice, and the individual photomicrographs are arranged in series to reconstruct the profile of the slice. The thicknesses and elevations may be ascertained from the reconstructed profile, as illustrated in FIG. 3, which is a photomicrograph of a cross-section of a paper structure of the type illustrated in FIGS. 1 and 2.

The thicknesses are established using Hewlett Packard ScanJet IIC color flatbed scanner to scan the photomicrograph and store the photomicrograph in a picture file format on a personal computer. The Hewlett Packard Scanning software is DeskScan II version 1.6. The scanner settings type is black and white photo. The path is LaserWriter NT, NTX. The brightness and contrast setting is 125. The scaling is 100%. The file is scanned and saved in a picture file format on a Macintosh IICi computer. The picture file is opened with a suitable photo-imaging software package or CAD program, such as PowerDraw version 6.0, available from Engineered Software of North Carolina.

Referring to FIG. 3, the thicknesses of the region 30 and 50 are indicated by circles having their diameters labeled K and P, respectively. First, the largest circle that can be inscribed in the region 50 being investigated is drawn using the PowerDraw software. The diameter of this circle is labeled P. The thickness P of the region 50 is the diameter of this circle multiplied by the appropriate scale factors (The scale factor is the magnification of the photomicrograph multiplied by the magnification of the scanned image).

Next, the smallest circles that can be inscribed in the portions of the region 30 on either side of the region 50 are drawn. The diameters of these circles are labeled K. The thickness K of the region 30 adjacent the region 50 is the average of the two diameters multiplied by the above mentioned scale factor.

The plane of the region 30 adjacent the region 50 is located by drawing a line connecting the centers of the two circles having the diameter K, as shown in FIG. 3.

For each of the ten samples, each occurance of a relatively thicker region 50 disposed between relatively thinner portions of a region 30 are investigated. For each case where a relatively thinner region 30 is identified on each side of a relatively thicker region 50, the line representing plane 23 is drawn. If this line intersects the region 50 in at least 25 percent of the occurances, then the paper from which the samples where taken is said to have relatively thicker regions disposed in the plane of the relatively thicker region, according to the present invention. For instance, if the ten samples yield 50 occurances of a a relatively thinner region 30 on either side of a relatively thicker region 50, then the relatively thicker regions 50 are said to be disposed in the plane of the relatively thinner region 30 if and only if the line drawn representing plane 23 intersects the the thicker region 50 in at least 13 of the 50 occurances.

Surface Smoothness

The surface smoothness of a side of a paper web is measured based upon the method for measuring physiological surface smoothness (PSS) set forth in the 1991 International Paper Physics Conference, TAPPI Book 1, article entitled "Methods for the Measurement of the Mechanical Properties of Tissue Paper" by Ampulski et al. found at page 19, which article is incorporated herein by reference. The PSS measurement as used herein is the point by point sum of amplitude values as described in the above article. The measurement procedures set forth in the article are also generally described in U.S. Pat. No. 4,959,125 issued to Spendel and U.S. Pat. No. 5,059,282 issued to Ampulski et al, which patents are incorporated herein by reference.

For purposes of testing the paper samples of the present invention, the method for measuring PSS in the above article is used to measure surface smoothness, with the following procedural modifications:

Instead of importing digitized data pairs (amplitude and time) into SAS software for 10 samples, as described in the above article, the Surface Smoothness measurement is made by acquiring, digitizing, and statistically processing data for the 10 samples using LABVIEW brand software available from National Instruments of Austin, Tex. Each amplitude spectrum is generated using the "Amplitude and Phase Spectrum.vi" module in the LABVIEW software package, with "Amp Spectrum Mag Vrms" selected as the output spectrum. An output spectrum is obtained for each of the 10 samples.

Each output spectrum is then smoothed using the following weight factors in LABVIEW: 0.000246, 0.000485, 0.00756, 0.062997. These weight factors are selected to imitate the smoothing provided by the factors 0.0039, 0.0077, 0.120, 1.0 specified in the above article for the SAS program.

After smoothing, each spectrum is filtered using the frequency filters specified in the above article. The value of PSS, in microns, is then calculated as described in the above mentioned article, for each individually filtered spectrum. The Surface Smoothness of the side of a paper web is the average of the 10 PSS values measured from the 10 samples taken from the same side of the paper web. Similarly, the Surface Smoothness of the opposite side of the paper web can be measured. The smoothness ratio is obtained by dividing the higher value of Surface Smoothness, corresponding to the more textured side of the paper web, by the lower value of Surface Smoothness, corresponding to the smoother side of the paper web.

Basis Weight

Basis weight is measured according to the following procedure.

The paper to be measured is conditioned at 71–75 degrees Fahrenheit at 48 to 52 percent relative humidity for a minimum of 2 hours. The conditioned paper is cut to provide twelve samples measuring 3.5 inch by 3.5 inch. The samples are cut, six samples at a time, with a suitable pressure plate cutter, such as a Thwing-Albert Alfa Hydraulic Pressure Sample Cutter, Model 240-10. The two six sample stacks are then combined into a 12 ply stack and conditioned for at least 15 additional minutes at 71 to 75 F and 48 to 52 percent humidity.

The 12 ply stack is then weighed on a calibrated analytical balance. The balance is maintained in the same room in which the samples were conditioned. A suitable balance is made by Sartorius Instrument Company, Model A200S. This weight is the weight in grams of a 12 ply stack of the paper, each ply having an area of 12.25 square inches.

The basis weight of the paper web (the weight per unit area of a single ply) is calculated in units of pounds per 3,000 square feet, using the following equation:

$$\frac{\text{Weight of 12 ply stack (grams)} \times 3000 \times 144 \text{ sq inch per sq ft.}}{(453.6 \text{ gm/lb}) \times (12 \text{ plies}) \times (12.25 \text{ sq. in. per ply})}$$

or simply:

Basis Weight (lb/3,000 ft$^2$)=

Weight of 12 ply stack (gm)×6.48

Macro-Caliper or Dry Caliper

The Macro-Caliper or dry caliper is measured using the procedure for measuring dry caliper disclosed in U.S. Pat. No. 4,469,735, issued Sep. 4, 1984 to Trokhan, which patent is incorporated herein by reference.

Bulk Density

Bulk Density is the basis weight of the web divided by the web's macro-caliper.

Absorbent Capacity

The absorbent capacity of a web is measured using the Horizontal Absorbative Capacity Test disclosed in above referenced U.S. Pat. No. 4,469,735.

Measurement of Web support apparatus Elevations

The elevation difference between the elevation 231 of the first felt surface and the elevation 261 of the web contacting surface 260 is measured using the following procedure. The web support apparatus is supported on a flat horizontal surface with the web patterning layer facing upward. A stylus having a circular contact surface of about 1.3 square millimeters and a vertical length of about 3 millimeters is mounted on a Federal Products dimensioning gauge (model 432B-81 amplifier modified for use with an EMD-4320 W1 breakaway probe) manufactured by the Federal Products Company of Providence, R.I. The instrument is calibrated by determining the voltage difference between two precision shims of known thickness which provide a known elevation difference. The instrument is zeroed at an elevation slightly lower than the first felt surface 230 to insure unrestricted travel of the stylus. The stylus is placed over the elevation of interest and lowered to make the measurement. The stylus exerts a pressure of about 0.24 grams/square millimeter at the point of measurement. At least three measurements are made at each elevation. The measurements at each elevation are averaged. The difference between the average values is the calculated to provide the elevation difference.

The same procedure is used to measure the difference between elevations 1231 and 261 illustrated in FIG. 14B.

What is claimed:

1. A method of forming a paper web, the method comprising the steps of:

providing an aqueous dispersion of papermaking fibers;

providing a foraminous forming member;

depositing the aqueous dispersion of papermaking fibers on the foraminous forming member;

forming an embryonic web of the papermaking fibers on the foraminous forming member, the embryonic web having a first surface and a second surface;

providing a web support apparatus having a web facing side comprising a first web contacting surface and a second web contacting surface, wherein a difference in elevation between the first and second web contacting surfaces is less than the thickness of the embryonic web;

transferring the embryonic web from the foraminous forming member to the web support apparatus wherein the first surface of the web is supported on the first and second web contacting surfaces of the web support apparatus;

imparting a predetermined pattern to the first surface of the web at a web consistency of between about 10 and about 60 percent;

providing a heated drying surface;

transferring the web to the heated drying surface at a web consistency of between about 20 and about 60 percent, wherein substantially all the second surface of the web is positioned adjacent the heated drying surface; and creping the web from the heated drying surface.

2. The method recited in claim 1 wherein the step of forming an embryonic web comprises forming an embryonic web comprising a fiber debonding agent.

3. The method recited in claim 2 wherein the step of forming an embryonic web comprises forming a multiple layer embryonic web, wherein an intermediate layer of the embryonic web comprises the fiber debonding agent.

4. A method of forming a paper web comprising the steps of:

providing an aqueous dispersion of papermaking fibers;

providing a foraminous forming member;

depositing the aqueous dispersion of papermaking fibers on the foraminous forming member;

forming an embryonic web of the papermaking fibers on the foraminous forming member, the embryonic web having a first surface and a substantially smooth, macroscopically monoplanar second surface;

providing a web support apparatus having a web facing side comprising first web contacting surface and a second web contacting surface, wherein a difference in elevation between the first and second web contacting surfaces is less than the thickness of the embryonic web;

transferring the embryonic web from the foraminous forming member to the web support apparatus wherein the first surface of the web is supported on the first and second web contacting surfaces of the web support apparatus;

imparting a predetermined pattern to the first surface of the web while maintaining the second surface of the web in a substantially smooth, macroscopically monoplanar configuration;

providing a heated drying surface;

positioning the substantially smooth, macroscopically monoplanar second face of the web adjacent the heated drying surface;

drying the web on the heated drying surface; and creping the web from the drying surface.

5. The method recited in claim 4 wherein the step of forming an embryonic web comprises forming an embryonic web comprising a fiber debonding agent.

6. The method recited in claim 5 wherein the step of forming an embryonic web comprises forming a multiple layer embryonic web, wherein an intermediate layer of the embryonic web comprises the debonding agent.

7. A method of forming a paper web comprising the steps of:

provinding an aqueous dispersion of papermaking fibers;

providing a foraminous forming member;

depositing the aqueous dispersion of papermaking fibers on the foraminous forming member;

forming an embryonic web of the papermaking fibers on the foraminous forming member, the embryonic web having a first surface and a substantially smooth, macroscopically monoplanar second surface;

providing a web support apparatus having a web facing side comprising first web contacting surface and a second web contacting surface, wherein a difference in elevation between the first and second web contacting surfaces is less than the thickness of the embryonic web;

providing a vacuum pressure roll;

transferring the embryonic web from the foraminous forming member to the web support apparatus;

providing a heated drying surface;

directing the web and the web support apparatus between the vacuum pressure roll and the heated drying surface, wherein the first web face is positioned against the web support apparatus and the substantially smooth, macroscopically monoplanar second face of the web is positioned against the heated drying surface, and wherein the web support apparatus is positioned adjacent the vacuum pressure roll;

adhering the second face of the web to the heated drying surface;

drying the web on the heated drying surface; and creping the web from the heated drying surface.

8. The method recited in claim 7 further comprising the steps of:

providing a source of steam; and directing the steam into the web before the step of directing the web between the vacuum pressure roll and the heated drying surface.

9. The method recited in claim 8 wherein the web support apparatus comprises a dewatering felt layer, and wherein the difference in elevation between the first and second web contacting surfaces of the web support apparatus is less than about 6.0 mils.

10. The method recited in claim 9 wherein the difference in elevation between the first and second web contacting surfaces is less than about 2.0 mils.

11. The method recited in claim 9 wherein the step of forming an embryonic web comprises forming an embryonic web comprising a fiber debonding agent.

12. The method recited in claim 11 wherein the step of forming an embryonic web comprises forming a multiple layer embryonic web, wherein an intermediate layer of the embryonic web comprises a debonding agent.

* * * * *

UNITED STATES PATENT AND TRADEMARK OFFICE
CERTIFICATE OF CORRECTION

PATENT NO. : 5,814,190
DATED : September 29, 1998
INVENTOR(S) : Dean Van Phan

It is certified that error appears in the above-identified patent and that said Letters Patent is hereby corrected as shown below:

Column 16, line 50, after "the" insert -- temporary wet strength resin --.

Column 16, line 50, delete "(i.e., dry wet strength resin".

Column 17, line 14, "monofilamnents" should read -- monofilaments --.

Column 18, line 43, "crossmachine" should read -- cross-machine --.

Signed and Sealed this

Eighth Day of June, 1999

Attest:

Q. TODD DICKINSON

Attesting Officer

Acting Commissioner of Patents and Trademarks